(12) United States Patent
Flynn et al.

(10) Patent No.: US 8,731,519 B2
(45) Date of Patent: May 20, 2014

(54) MOBILE HANDSET EXTENSION TO A DEVICE

(75) Inventors: Judson Flynn, Decatur, GA (US); Erick John Haughn, Norcross, GA (US); John Lewis, Lawrenceville, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 732 days.

(21) Appl. No.: 12/206,489

(22) Filed: Sep. 8, 2008

(65) Prior Publication Data

US 2010/0062770 A1   Mar. 11, 2010

(51) Int. Cl.
| | |
|---|---|
| H04M 1/66 | (2006.01) |
| H04W 12/00 | (2009.01) |
| H04W 12/12 | (2009.01) |
| H04W 12/06 | (2009.01) |
| H04M 1/67 | (2006.01) |
| H04M 1/673 | (2006.01) |

(52) U.S. Cl.
CPC ............. *H04W 12/00* (2013.01); *H04W 12/12* (2013.01); *H04W 12/06* (2013.01); *H04M 1/67* (2013.01); *H04M 1/673* (2013.01)
USPC ............ 455/410; 455/466; 455/411; 370/338

(58) Field of Classification Search
USPC ............ 455/3.03, 557, 569.1, 92, 100, 151.1, 455/352, 410, 411, 41.2, 418–420, 232.1; 709/221, 204; 375/146, 345, 295; 715/759; 713/156; 370/209, 342, 320, 370/338, 247
See application file for complete search history.

(56) References Cited

U.S. PATENT DOCUMENTS

| | | | | |
|---|---|---|---|---|
| 5,701,579 | A  * | 12/1997 | Dolan et al. ................... | 725/106 |
| 6,959,204 | B1 * | 10/2005 | Townend et al. .............. | 455/557 |
| 7,015,833 | B1 * | 3/2006 | Bodenmann et al. .......... | 341/20 |
| 7,106,845 | B1 * | 9/2006 | Zhuk et al. ............... | 379/207.11 |
| 7,277,726 | B2 * | 10/2007 | Ahya et al. ..................... | 455/557 |
| 7,395,090 | B2 * | 7/2008 | Alden ........................... | 455/557 |
| 7,512,402 | B2 * | 3/2009 | Narayanaswami et al. ... | 455/420 |
| 7,702,340 | B2 * | 4/2010 | Pournasseh et al. .......... | 455/466 |
| 7,738,926 | B2 * | 6/2010 | Michel et al. .............. | 455/569.2 |
| 2002/0058530 | A1 * | 5/2002 | Akama ......................... | 455/556 |
| 2003/0079003 | A1 * | 4/2003 | Burr .............................. | 709/221 |
| 2003/0225832 | A1 * | 12/2003 | Ludwig ......................... | 709/204 |
| 2004/0063464 | A1 * | 4/2004 | Akram et al. .................. | 455/559 |
| 2004/0097219 | A1 * | 5/2004 | Lee ................................ | 455/418 |
| 2004/0203358 | A1 * | 10/2004 | Anderson et al. ............ | 455/41.1 |
| 2005/0124383 | A1 * | 6/2005 | Booth ........................... | 455/557 |
| 2005/0138566 | A1 * | 6/2005 | Muller et al. ................. | 715/759 |

(Continued)

*Primary Examiner* — Mahendra Patel

(74) *Attorney, Agent, or Firm* — Amin, Turocy & Watson, LLP

(57) ABSTRACT

System(s) and method(s) are provided for extension of mobile operation to a device. An extension interface comprises a client component within a mobile that is linked to a client component within the device. Extension of mobile operation is secured via delivery of credentials associated with the mobile to the device. Delivery of credentials is temporary and typically spans the period during which mobile operation is extended to the device. Mobile's application(s) and content(s) can be conveyed to the device for utilization therein. An emulation component that can reside at least in part on the client component within the device can emulate mobile operation. Client component within the mobile can include at least in part (i) a component that downloads drivers for communication with, and utilization of, the device to which mobile operation is extended, and (ii) a component that can scan for wireless-capable devices to extend mobile service thereto.

44 Claims, 16 Drawing Sheets

(56) References Cited

U.S. PATENT DOCUMENTS

2006/0229108 A1* 10/2006 Cehelnik .................. 455/569.1
2008/0081609 A1* 4/2008 Burgan et al. ................ 455/425
2009/0215385 A1* 8/2009 Waters et al. .................... 455/1
2009/0235069 A1* 9/2009 Sonnega et al. ............... 713/156

* cited by examiner

MOBILE HANDSET EXTENSION TO A DEVICE

TECHNICAL FIELD

The subject innovation relates to wireless communications and, more particularly, to secure extension of wireless operation and services to electronic devices that operate outside a mobile wireless network.

BACKGROUND

Mobile wireless communication has become widely accessible in various markets for a myriad applications ranging from productivity and commerce, to remote operations in hostile or inaccessible environments and to entertainment. Yet, access to mobile resources requires service commitments like service contracts and subscriptions, which are typically difficult to port across devices other than those for which service has been acquired. Moreover, as provided by wireless network platforms, mobile operation within contracted service exploits security identifiers associated with served mobile devices to ensure information integrity as well as secure management of communications. Furthermore, available operational resources (e.g., limited display real estate; confined keyboard space and data entry capabilities; limited font sizes that facilitate consumption of lengthy documents) and applications associated with a served mobile device like a cellular telephone can fail to be adopted widely among varied consumer segments. The latter can leave business opportunities unexploited by service providers or network operators. Such difficulties can hinder dramatic pervasiveness of secure mobile communications and ensuing convenience.

SUMMARY

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

System(s) and method(s) are provided for extension of mobile operation to a device. An extension interface comprises a client component within a mobile that is linked to a client component within a device to which mobile operation is extended. Extension of mobile operation is secured via communication of security credentials associated with the mobile to the device via a link component that functionally couples both client components in the extension interface. Extension of security credential is temporary and typically spans a time interval during which mobile operation is extended to the device.

In addition, application(s) and content(s) can be conveyed to the device for utilization thereof. An emulation component which can be at least a part of the client component that resides in the device can emulate mobile operation. Emulation can include adaptation and optimization of received mobile application(s) to application(s) that optimally utilizes operational resources of the device. Adaptation and optimization can be accomplished through artificial intelligence or machine-learning techniques. Moreover, a component that can be at least a part of the client component within the device can provide add-on features (e.g., voice and text translation, or voice-to-text and text-to-voice conversion) to a call sustained via the mobile through the extension interface. Client component within the mobile can include at least a portion of a component that downloads drivers for communication with, and utilization of, the device to which mobile operation is extended. Furthermore, the client component that resides within the mobile can scan for wireless capable devices to extend mobile service thereto, and for available wireless network within the environment of a device in order to offload service from a first wireless network.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention may be employed. Other aspects, advantages and novel features of the invention will become apparent from the following detailed description of the invention when considered in conjunction with the drawings.

DETAILED DESCRIPTION

Figure 1:
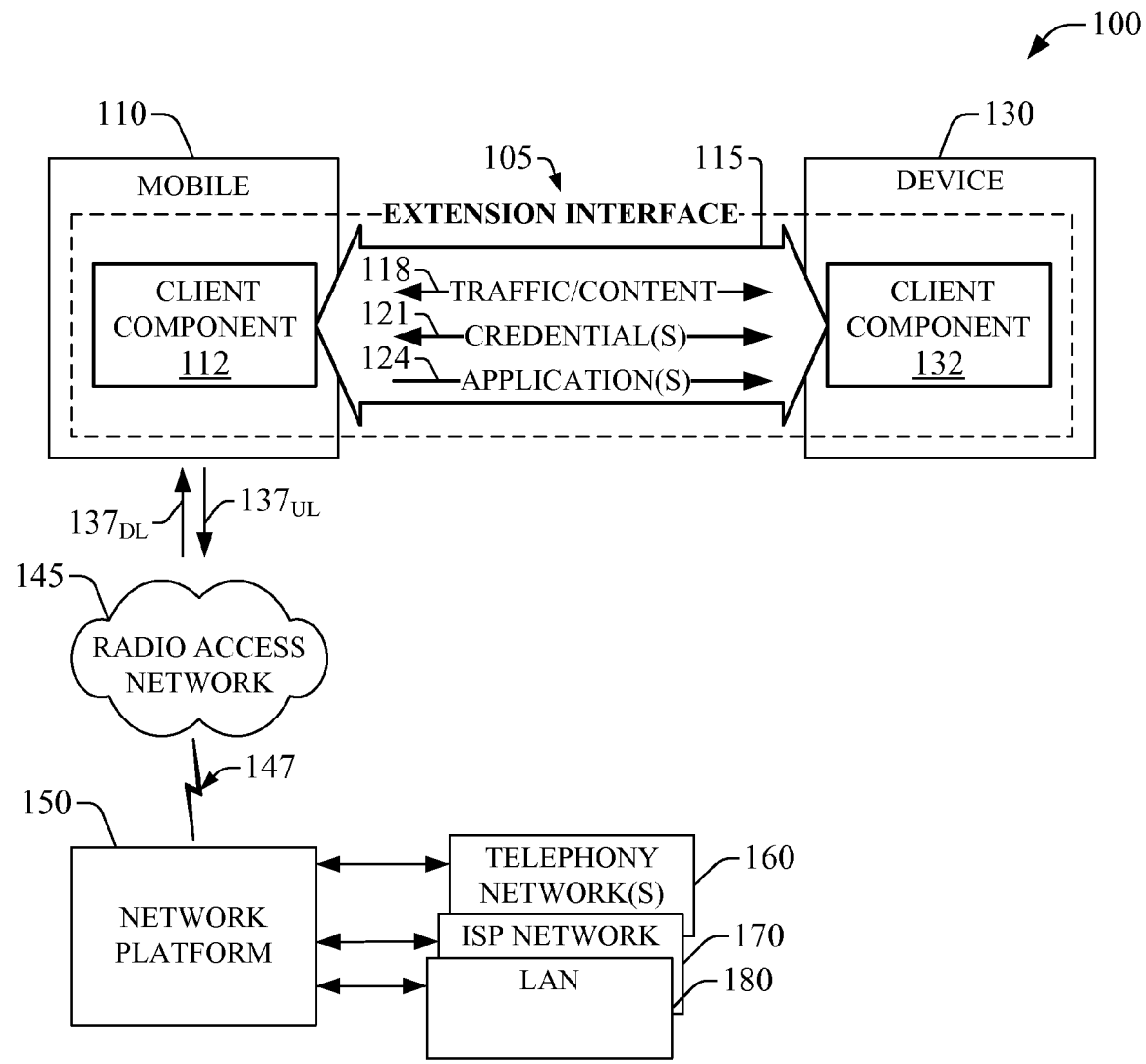
FIG. 1 is a block diagram of an example system that extends operation of a mobile handset to a device in accordance with aspects described in the subject specification.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component," "system," "platform," "service," "framework," "interface," "node," and the like are intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment," "mobile station," "mobile," subscriber station," "access terminal," "terminal," "mobile handset," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "home Node B (HNB)," and the like, are utilized interchangeably in the subject application, and refer to a wireless network component or appliance that serves and receives data, control, voice, video, sound, gaming data, or substantially any data-stream or signaling-stream from a set of subscriber stations. Data and signaling streams can be packetized or frame-based flows.

Furthermore, the terms "user," "subscriber," "customer," "consumer," "agent," and the like are employed interchangeably throughout the subject specification, unless context warrants particular distinction(s) among the terms. It should be appreciated that such terms can refer to human entities or automated components supported through artificial intelligence (e.g., a capacity to make inferences based on complex mathematical formalisms) which can provide simulated vision, sound recognition, and so forth.

FIG. 1 is a block diagram of an example system 100 that extends operation of a mobile handset 110 to a device 130. In system 100, a client component 112 that resides within mobile 110 is functionally connected through a link component 115 to a client component 132 that resides within device 130. Client components 112 and 132, and link component 115, embody an extension interface 105 that facilitates provision of mobile operation and information to device 130. Mobile 110 can be substantially any user equipment with a SIM card. Mobile 110 is connected through wireless uplink $137_{UL}$ and downlink $137_{DL}$ to a radio access network 145 attached via link 147, which can be either wired or wireless, to a network platform 150 (e.g., a core network in cellular wireless technologies such as Third Generation Partnership Project (3GPP) Universal Mobile Telecommunication Services (UMTS)). Network platform 150 can be functionally connected to a set of external networks like telephony network(s) 160, Internet Service Provider (ISP) network 170, and local area network 180 (e.g., an enterprise network). Device 130 can be substantially any electronic device that provides a set of functionalities. For example, device 130 can be a personal computer (PC), an audio-visual or data projector, a television, a camera, etc.

In an aspect of the subject innovation, mobile operation is extended from mobile 110 to device 130 via extension interface 105. Such extension is herein termed forward mobile extension. In such scenario, functional resources of device 130 such as display interface(s), data entry interface(s), or substantially any interface component, can act as operational extensions of the mobile handset 110. As an example, when device 130 is a PC, one or more PC monitor screens and a PC keyboard can be exploited to deliver mobile content to an end user, and to provide the end user with text entry capabilities that facilitate utilization of communication applications of mobile handset 110, like short message service (SMS), multimedia message service (MMS), instant message (IM), email, etc. It should be appreciated that forward mobile extension can thus facilitate a mobile office, by providing connectivity (e.g., mobile's browser can be employed through a device) and augmenting productivity by allowing access to email communication(s) through a mobile). Demonstrations and presentation by traveling salesperson workforce, or lecturers, can also benefit from extension of mobile operation to a device, e.g., a PC, via a reduction of salespersons or lecturers transported presentation materials, such as laptop computers.

In another aspect, reverse mobile extension can be effected, wherein device functionality is exploited (e.g., controlled) via mobile 110. For example, a non-networked device can be commanded to deliver content to mobile 110. It should be appreciated that content need not be traffic; for instance, a wireless-capable camera (e.g., a ZigBee® camera) on a pantry in a home can convey snapshot(s) of available items to an attached cellular phone utilized by a consumer in a grocery store in order for the consumer to prepare a list of necessary groceries.

It should be noted that in either forward or reverse extension, mobile operation extension interface 105 can facilitate utilization of operational resources on mobile 110 or on device 130.

Client component 112 automatically detects connection to client component 132 in device 130. Detection can take place according to a predetermined attachment procedure compatible with operational aspects of device 130 and associated wired or wireless capabilities (e.g., wired ports like Ethernet or phone jack(s), universal serial bus (USB) connector(s), a RS (Recommended Standard)-232 port, or FireWire bus connector(s); or wireless ports or routers and associated antennae, e.g., WiFi gateway, Bluetooth port, infrared (IR) wireless port . . . ). Link component 115 facilitates functional coupling and information transport among client components 112 and 132. In an aspect, link component 115 can be a wired link; e.g., single- and multi-line twisted-pair, such a FireWire bus; a general purpose interface bus (GPIB) line; T1/E1 phone line; a digital subscriber line (DSL) either synchronous or asynchronous; an asymmetric ADSL; an optical fiber backbone; a coaxial cable . . . ). It should be appreciated that link component 115 can power up device 130 upon connection. To mitigate substantive mobile's battery consumption, a supplemental source of energy, e.g., a solid-state fuel cell, or a thin-film solar-cell panel which can coat a portion of the surface of the device, can extend mobile's battery lifetime. Alternatively, or in addition, device 130 can power mobile 110 upon attachment.

Client component 112 also manages attachment at device 130. Upon connection, client 112 can convey credential(s) 121, e.g., identification credentials like secure handset system identity module (SIM) information, that facilitate communication of the mobile 110 identity to a wireless network (e.g., radio access network 145 and network platform 150). Once credential(s) 121 are deployed (e.g., via a virtual private network, a secure socket layers, or the like) onto device 130, no network re-authentication of device 130 is necessary for networked operation. The temporary lending of SIM security information to device 130 facilitates secure network authorization to network entities like home location register (HLR) or Internet Protocol Multimedia Service (IMS). In addition, such authorization, or access, mitigates duplicate registrations on HLR or IMS infrastructure; HLR or IMS can recognize secure authentication of device 130 and allow one mobile ID authorization at a time, or one authorization in addition to a borrowed extension at a time.

In an aspect of the subject innovation, device 130 is non-networked. Thus, through the extension interface 105, device 130 exploits mobile 130 wireless transport mechanism(s) as a pass-through to a wireless network (e.g., radio access network (RAN) 145 and network platform 150). Once mobile 110 disconnects either physically or logically from device 130, client component 132 revokes received credential(s) 121, which can include license information for application(s) 124 as indicate above, and thus networked traffic no longer can be utilized. Revocation of credential(s) 121 substantially mitigates opportunity for network security associated with the device identity to be copied or replicated when device 130 is not directly connected or associated with mobile 110.

Client component 112 also can exchange traffic/content 118 (e.g., files or application(s) data) which resides in mobile 110 with client component 132. Moreover, client 112 can convey application(s) 124 to client component 132; the application(s) can be conveyed as a source-code package or bundle, as executable file(s), or indirectly through a license file, key or token once the application(s) 124 reside in device 130.

With respect to wireless service, in an aspect of the subject innovation, network platform 150 includes components, e.g., nodes, gateways, and interfaces, that facilitate packet-switched (PS) (e.g., internet protocol (IP)) and circuit-switched (CS) traffic and control generation for network wireless communication through one or more technologies. Radio access network 145 includes various base station and access points for substantially any type of coverage over-the-air coverage with disparate spatial extents, e.g., macro (typically outdoors), micro (confined outdoor spaces like parking lots, or indoor spaces such as a library, a hospital, a retail store, a residence . . . ), or femto (indoor spaces) cell coverage, or any combination thereof. A single provider typically operates network platform 150.

Aspects of extension of mobile 110 operation to device 130, and embodiments of extension interface 105 and associated mobile 110 and device 130 that exploit such aspects are discussed next.

Figure 2A:
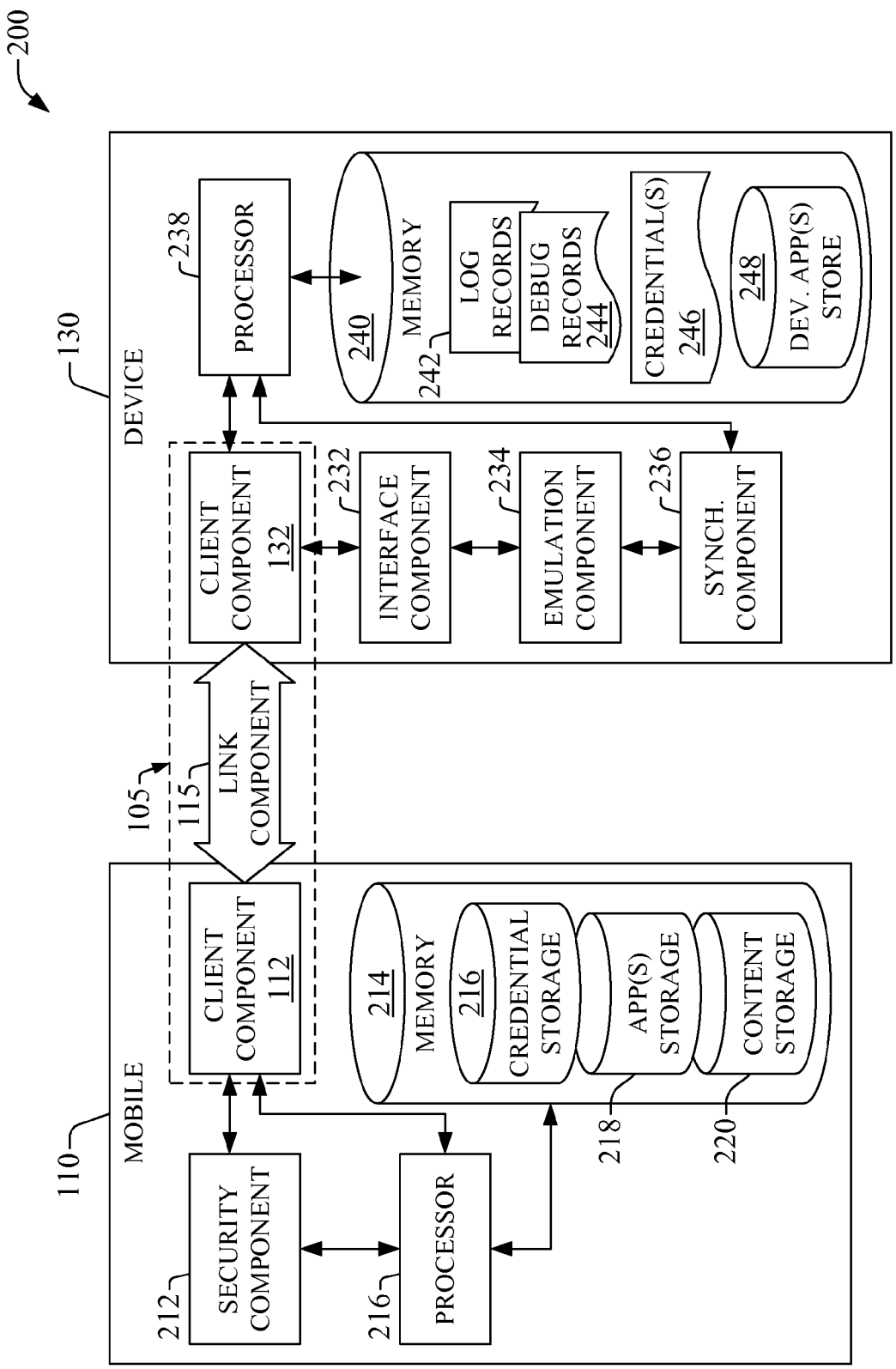
FIGS. 2A-2B illustrate, respectively, example mobile and device embodiments that facilitate mobile extension to the device, and an example embodiment for a component that manipulates mobile application(s) at the device level in accordance with aspects described herein.
Figure 2B:
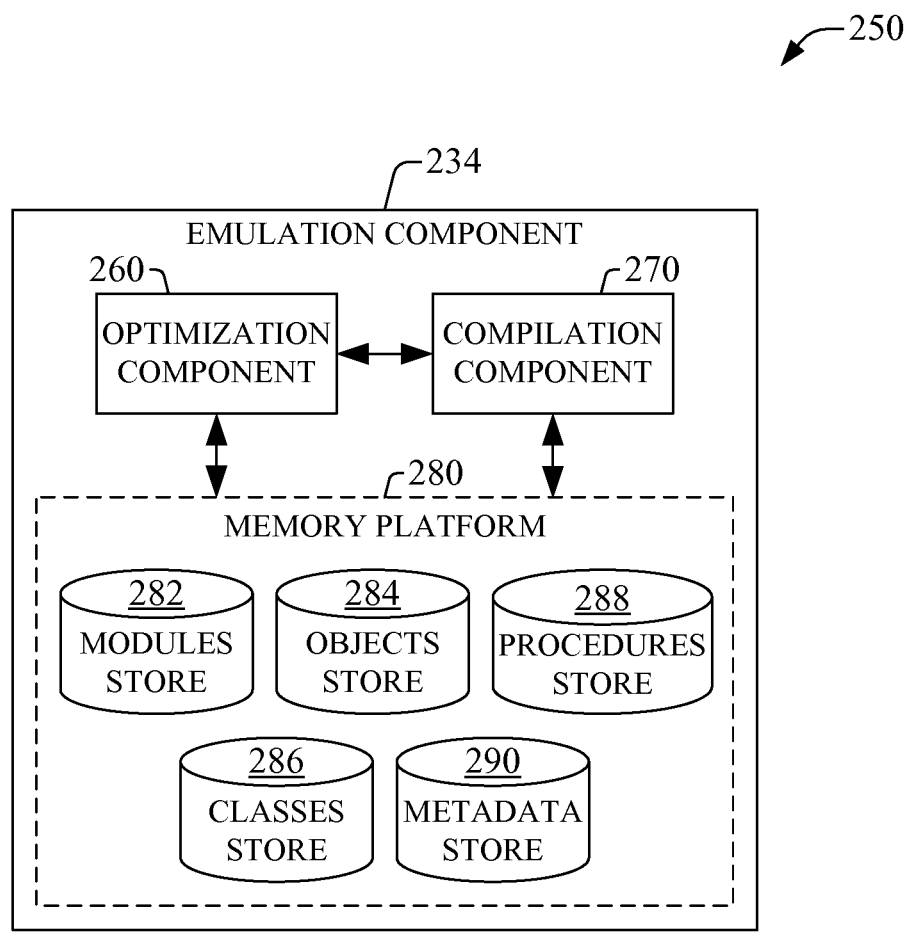

FIGS. 2A and 2B illustrate embodiments for a mobile and a device that exploit mobile operation extension to the device, and an embodiment for an emulation component that manipulates extended mobile application(s), respectively. In block diagram 200, client component 112 can employ security component 212 to securely convey credential(s) 121 and application(s) 124. Security mechanism(s) can include at least one of encryption, password protection, or biometric locking (e.g., information access through an authorized or registered biometric instrument like fingerprint(s) or iris recognition, voice recognition, or any combination thereof). In addition, security component 212 can secure specific traffic/content 118 that client component 112 delivers to device 130. It is noted that security component 112 can reside at least in part within client component 112. Memory 214 can include a credential storage 216, an application(s) storage 218, and content storage 220. A processor 216 can provide at least in part the functionality of security component 212 and client component 112.

With respect to device 130, client component 132 receives credential(s) 121, applications(s) 124, and traffic/content 118. Credential(s) 121 can be stored in memory 240; in an aspect, credential(s) 121 can be stored in a credential(s) storage 246 (e.g., a register or a stack). In addition, traffic/content 118 can be utilized and generated by interface component 232, which can be accessed by an end user. It should be appreciated that interface component 232 can facilitate access to mobile extensibility (e.g., establish mobile operation extension via client component 132 within extension interface); for example, interface component 232 includes various instruments (e.g., via a keyboard, touch screen, microphone, biometric pad, camera(s), speakers, and so forth) for data input and data output.

Device 130 can include an emulation component 234 that emulates the operation of mobile 110, and manages synchronization component 236. Emulation component 234 can receive input data from, and convey data to, interface component 232. In addition, emulation component 234 can retain emulation operational events and records in a log records storage 242 (e.g., a register or stack) and a debug records storage 244 (e.g., a register or a stack), which can contain substantially all information related to activity generated through emulation component 234 and via synchronization component 236. In an aspect of the subject innovation, information stored in log records 242 and debug records 244 can be conveyed to manufacturer(s) of device 130 and mobile 110 for development, and operations and maintenance of the extension interface, emulation component 234 and synchronization component 236 as well. It is noted that emulation component 234 can reside at least in part within client component 132.

It should be appreciated that disparate devices typically have disparate functionalities (e.g., control-oriented, image and sound display-oriented, computation-oriented . . . ), and operational resources (e.g., display size and type, computing power associated with aspects of a processor, like processor 238 resident in device 130, or graphic processing units; memory structure and type determined at least in part by a memory such as memory 240 present in the device; access to peripherals . . . ). Information on device functionality and operational resources can be gleaned from identification codes or numbers like electronic product code(s), universal product code(s), serial number(s), etc., or from descriptor(s) or specification(s) stored in memory 240 by device's manufacturer or from a similar device specification resource (e.g., an online catalog, or database; not shown). In one aspect of the subject innovation, emulation component 234 can migrate received application(s) 124 to device-specific application(s), which can be stored in device application(s) store 248. Through adaptation or optimization of received application(s) 124, emulation component 234 can optimally exploit substantially all resources available to device 130, which can result in a richer user experience.

To facilitate adaptation and optimization, application(s) 124 can be coded in a modular, object-oriented paradigm (e.g., Common Language Infrastructure (CLI) within a runtime system implementation (e.g., Microsoft® Common Language Runtime (CLR), DotGNU Portable.NET, or Mono Development). Modular, object-oriented coding can allow emulation component 234 to reduce classes and associated metadata in received source code for application(s) 124 to code assemblies containing metadata and intermediate language that describe the source code and associated methods that facilitate application's functionality. Such code reduction can be stored in log records 242 or debug records 244. Such code assemblies can be utilized to compile mobile application(s) 124 received in a device (e.g., device 130) regardless of the specifics of software or firmware that operates the device. As an example, application(s) 124 can be coded employing Microsoft® C#, or substantially any modular, object-oriented language such as Microsoft® Visual Basic, Java™, Python, Smalltalk, C++, Verilog, Delphi, Perl, etc., can be employed as well.

With respect to FIG. 2B, the illustrated example embodiment 250 for emulation component 234 includes an optimization component 260 functionally coupled to a compilation component 270; both component can access memory platform 280. Compilation component 270 can compile received application(s) 124 in a just-in-time (JIT) manner, and execute it within a runtime, or virtual machine, environment associated with emulation component 234. Optimization component 260 can analyze received source-code packages or bundles to ensure application(s) 124 are object-oriented, or component-oriented, code. Result of such analysis can be stored in log records 242 or debug records 244. In an aspect of the subject innovation, to compile source code of application(s) 124 that is optimal for a specific device (e.g., device 130), compilation component 270 can exploit optimization component 310 to adapt received application source code through code elements stored in modules store 282, objects store 284, procedures store 288, classes store 286 and/or metadata store 290. Adaptation or optimization can include incorporation of at least one of modules, objects, classes, procedures or metadata in order to achieve an optimal performance for the specific device (e.g., device 130), and inclusion of metadata that manipulates a set of assemblies associated with application(s) 124 source code in accordance with features (e.g., aspects of operational resources) provided by device 130, and characteristics of application(s) 124. Records of adaptation or optimization, or both, can be stored in log records 242 or debug records 244. It should be appreciated that in view of the modular characteristics of the optimal code, substantially any module, object, procedure, class, or metadata generated as a result of optimization can be stored within memory platform 330 in a corresponding storage element. It should be further appreciated that compilation component 270 and optimization component 260 can be employed in development or design of application(s) 124, so as to facilitate code structures (e.g., object(s), class(es), procedure(s), . . . ) to memory platform 280 that are necessary to achieve specific customization.

To automatically adapt or manipulate received application(s) 124, optimization component 260 can employ artificial intelligence. As indicated above, the term "intelligence" refers to the ability to reason or draw conclusions about, e.g., infer, the current or future state of a system based on available information about the system. Artificial intelligence (AI) can be utilized to identify a specific context or action, or generate a probability distribution of specific states of a system without human intervention. To infer optimal source code to achieve optimal performance of a received application within a device (e.g., device 130), optimization component 310 can rely on artificial intelligence techniques, which apply advanced mathematical algorithms—e.g., decision trees, neural networks, regression analysis, principal component analysis (PCA) for feature and pattern extraction, cluster analysis, genetic algorithm, and reinforced learning—to information on application's code source structure.

In particular, optimization component 310 can employ at least one of various methodologies for learning from data and then drawing inferences from the models so constructed, e.g., Hidden Markov Models (HMMs) and related prototypical dependency models, more general probabilistic graphical models, such as Dempster-Shafer networks and Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing various automated aspects described herein. The foregoing methods can be applied to identify application's source code structure (e.g., objects, classes, or metadata employed for specific functionality) and associated relationships, and suitable modifications (e.g., overload specific classes, change class inheritance or object types, change logic of specific procedures or exploit optimized libraries) that can result in optimal performance or utilization of available resources to a device (e.g., device 130).

Figure 3:
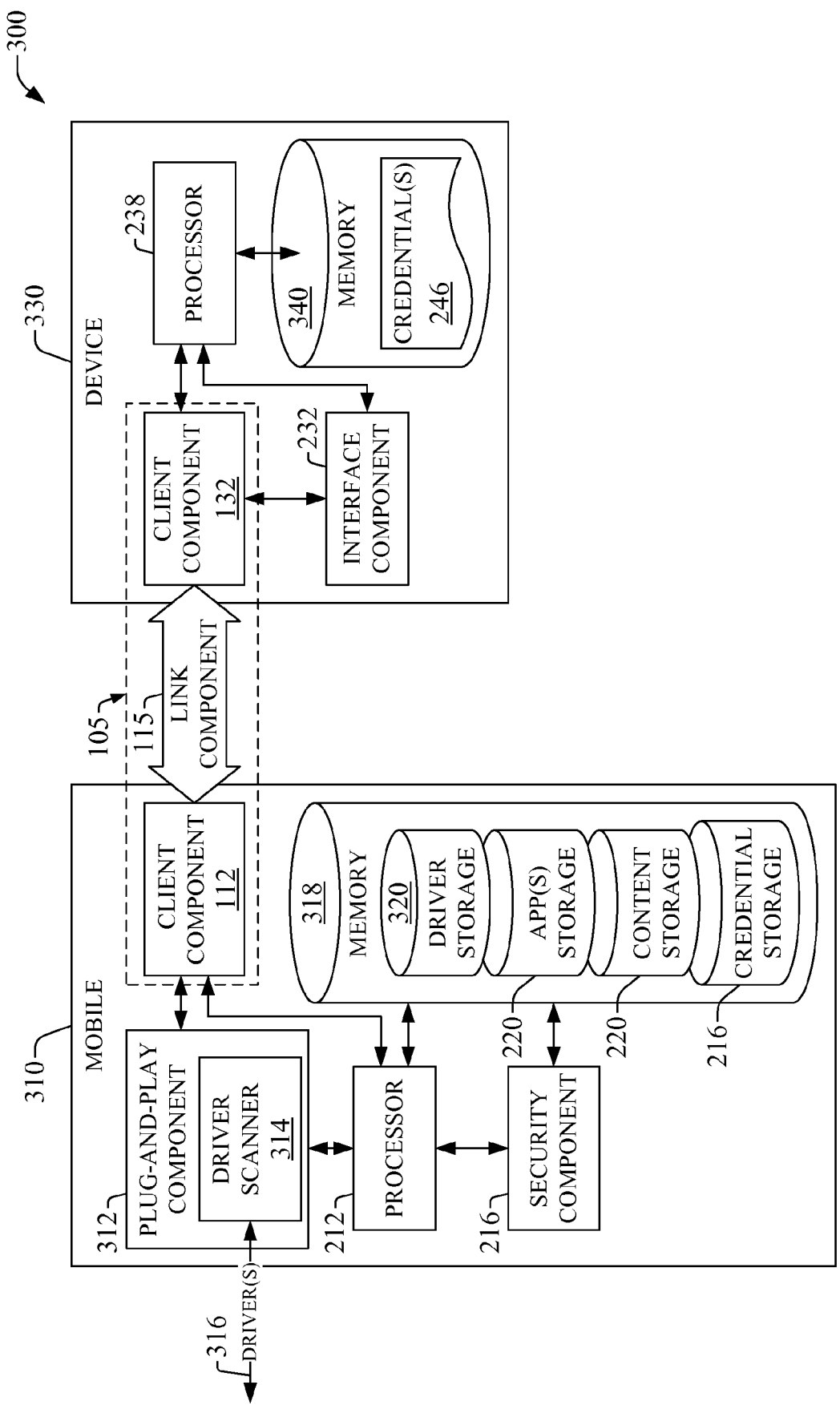
FIG. 3 is a block diagram of example embodiments of a mobile and a device to which mobile operation has been extended via an extension interface in accordance with aspects described herein.

FIG. 3 is a block diagram 300 of example embodiments of a mobile 310 and a device 330 to which mobile operation has been extended via an extension interface 105. In mobile 310, components with like numerals as those in mobile 110 have substantially the same functionality thereof. Mobile 310 is functionally connected to device 330 via an extension interface 105 as described above in connection with FIG. 1, for example: Extension interface 105 includes client component 112, which can reside in mobile 310 and is linked through link 115 to client component 132 within device 330. In embodiment 310, upon detection of connectivity to device 130, client component 112 conveys credential(s) that are stored in credential(s) storage 246. In addition, a plug-and-play (P&P) component 312, functionally coupled to client component 112, scans for driver(s) 316 via driver scanner, or driver scanner component, 314. It is noted that P&P component 312 can also reside within client component 112. In an aspect, driver(s) 316 can be retrieved upon a request from client component 112 in response to detection of mobile operation extension to device 330, and utilized to facilitate communication of traffic or content (e.g., traffic/content 124) thereto. In an aspect of the subject innovation, driver(s) 316 can be downloaded from the Internet (e.g., ISP network 170 via network platform 150; driver(s) 316 content can be received through random access network 145 through wireless downlink $137_{DL}$). Retrieved driver(s) 316 can be temporarily stored in memory 318, or persisted (e.g., stored for an undetermined time interval) in driver storage 320 as a part of a driver library for future utilization of device 330. In another aspect, mobile 310 can infer through AI which drivers to retain in driver storage 320 based on historic data on mobile extension usage (e.g., devices to which mobile is frequently extended). Such automated discrimination can save a wireless network that server the mobile RF bandwidth and time at the expense of memory utilization; it should be appreciated that memory (e.g., memory 318) is a resource substantially more affordable than RF bandwidth, which is typically regulated.

In addition, it should be appreciated that device 330 can receive traffic or content that can be conveyed to an end user via interface component 232. Moreover, client component 132 can manage interaction with an end user via the interface component 232. Information associated with such interaction can be conveyed to, and utilized by, mobile 310.

At least two advantages of exploiting plug-and-play component 312 as a part of extension interface for mobile operation extension are the following. (i) Devices with low-level computing resources (e.g., cameras, data projectors . . . ) can be utilized to deliver mobile traffic or content stored within mobile 310 without a need to emulate mobile operation. For example, mobile device 330 can be a multimedia projector that can deliver mobile traffic, e.g., sound or voice, via extension interface 105; lectures, presentations, television shows, and so on, can be broadcasted through the multimedia projector via mobile 310. In particular, a lecturer or presenter can arrive at a lecture hall or presentation site, connect his or her mobile to the multimedia projector via an extension interface 105, download suitable drivers, retrieve his or her presentation from a server in-the-cloud resident in a wireless network platform (e.g., network platform 150) or associated networks, and proceed to deliver his or her lecture or presentation. (ii) In view of client component 112 exploits received driver(s) 316 or stored driver(s) in driver storage 320, substantially any device 330 (e.g., contemporary devices, or legacy devices) can be extended to consume mobile content or traffic.

Figure 4:
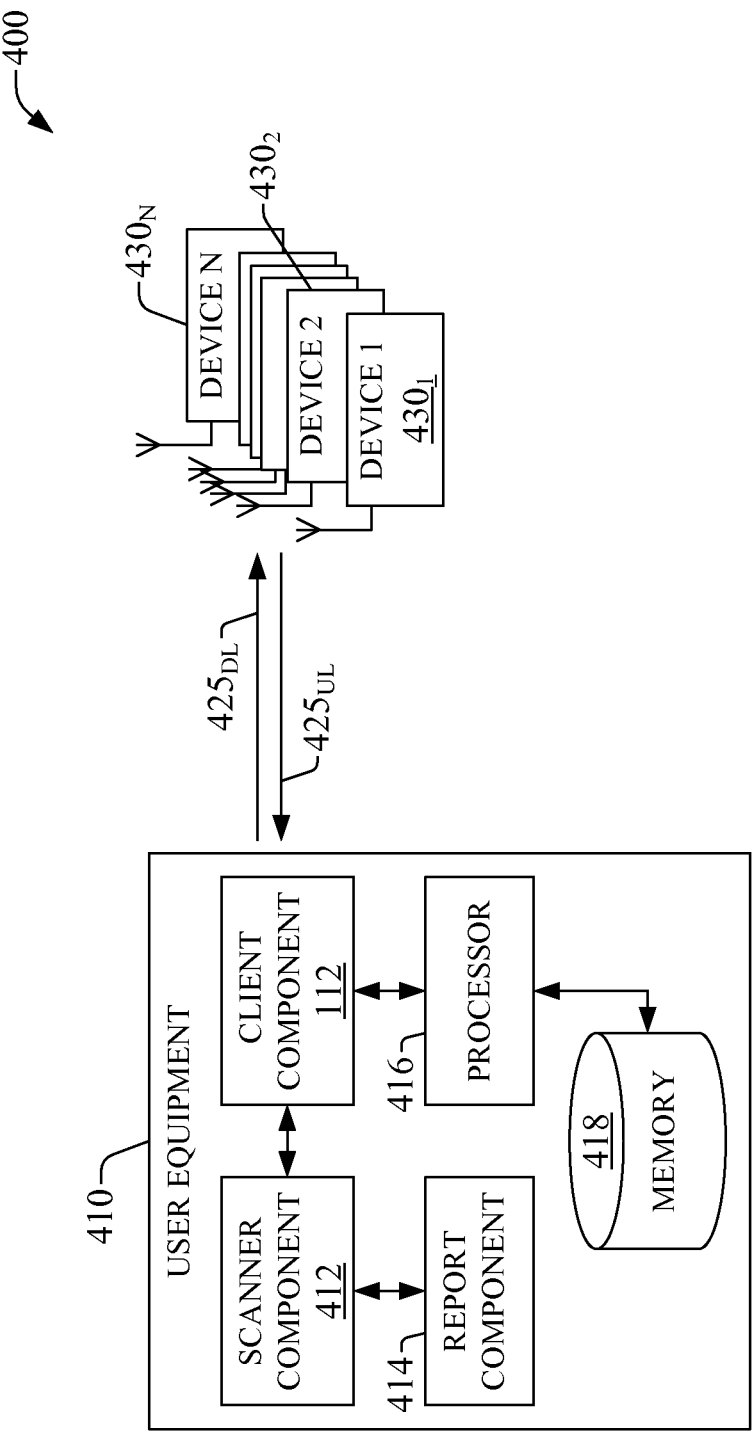
FIG. 4 illustrates a block diagram of an example system that scans for available wireless devices to extend mobile operation thereto in accordance with aspects described herein.

FIG. 4 illustrates a block diagram of an example system 400 that scans for available wireless devices to extend mobile operation thereto. In system 400, extension interface comprises client component 112 and its counterpart resident in each of a set of devices $430_1$-$430_M$ (M is a positive integer) that can deliver wireless signal. Additionally, link component 115 is embodied in a wireless downlink $425_{DL}$ and uplink $425_{UL}$, the links operate in accordance with wireless technology employed by a specific device that partakes in establishing such links, which can be facilitated through a multi-mode operation of mobile 510. In an aspect of example system 410, client component 112 exploits scanner component 412 to scan one a set of wireless channels that mobile 410 can utilize for communication for signals transmitted from a set of devices $430_1$-$430_M$. Substantially any of devices $430_1$-$430_M$ can operate and provide functionality in its native mode (e.g., tethered quasi-stationary operation), and send wireless pilot signal(s) or management frames at specific time instants in order to facilitate detection by a mobile (e.g., mobile 410). The periods at which pilot signal or management frames are conveyed can be determined by a client component that is part of the extension interface and resides within the device. In an aspect, as indicated above, mobile device can be a multi-mode wireless device and thus various wireless signals (e.g., signaling pilot in control channel(s), or in-band signaling such as management frames) in various RF bands and modulated in accordance with multiple modulation schemes can be probed. Scanner component 412 can report available wireless signal(s) to client component 112 via report component 414. Report component 414 can provide such report(s) to an end user of mobile 410 through multiple indicia (e.g., visual or audio signaling). It is noted that scanner component 412 and report component 414 can be part of the extension interface or reside within client component 112.

Reports generated via report component 414 are actionable information that can be employed to determine whether to automatically or on-demand extend mobile operation to a detected, available wireless device (e.g., device $430_2$). As an example, an extension interface in a subscriber station (e.g., mobile 410) can scan and detect a security camera (e.g., device $430_2$) with wireless capability (e.g., a device based on ZigBee® wireless communication technology, or substantially any other wireless technology), so that images captured by the security camera can be displayed through the subscriber station. (The latter is an example of reverse mobile extension.) In a scenario, a business owner can arrive at his or her store and notice suspicious, unexpected activity or events (e.g., lights on, semi-open door, window broken . . . ) inside or near the store, and thus utilize his or her mobile to extend mobile operation, and manipulate or operate the security camera wirelessly to confirm it is safe to enter the store. It should also be appreciated that substantially any information (e.g., images of individuals who broke into the store) received from the security camera, which has been extended to operate through the mobile, can be manipulated (e.g., a picture taken, images relayed to law enforcement officials, and so on) via the mobile.

In an aspect of mobile 410, processor 416 provides at least in part the functionality of client component 112, scanner component 412, and report component 414. Data structures, code instructions, and algorithms related to such functionality can be stored in memory 418 and utilized by processor 416.

Figure 5:
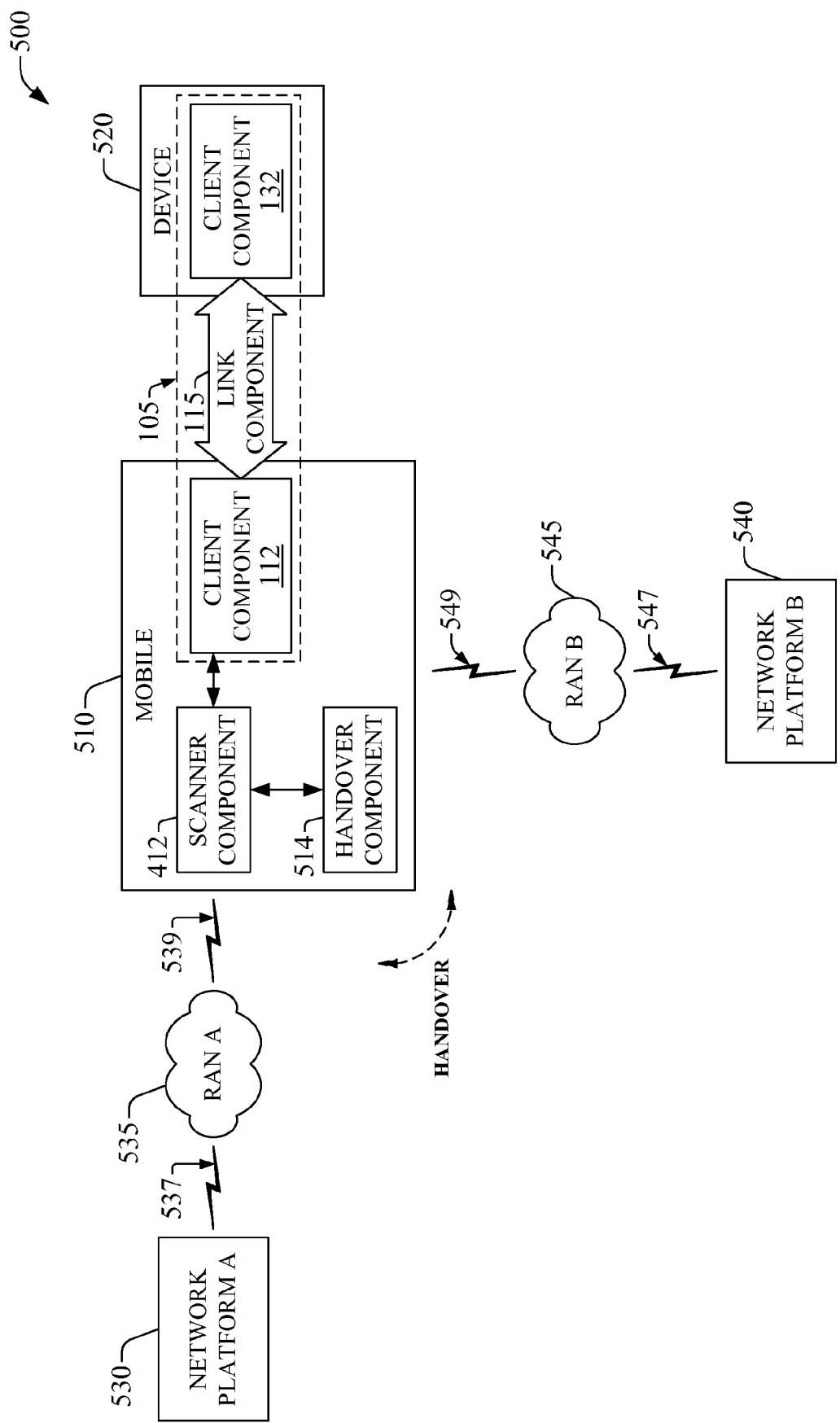
FIG. 5 is a block diagram of an example system that exploits disparate networks upon extension of mobile operation to a device in accordance with aspects of the subject innovation.

FIG. 5 is a block diagram of an example system 500 that exploits disparate networks upon extension of mobile operation to a device. Mobile 510 can communicate wirelessly through a first network platform A 530 access via a first RAN A 535; link 537 conveys traffic and signaling among network platform A 530 and RAN A 535, and link 539 delivers traffic or signaling among mobile 510 and RAN A 535. As discussed above, telecommunication and service can be extended from mobile 510 to device 520 through an extension interface 105 that comprises a client component 112 that resides within mobile 520 and is linked, through link component 115, to a client component 132 in device 520. In system 500, a scanner component 412 can detect signal(s) in disparate RF channels and various modulation formats, and attach to a second RAN that conveys such signal(s). Scanner component 412 can reside at least in part within client component 112. Handover component 514 can manage handoff to the second network. In an aspect, handover component 514 can include various handoff procedures (e.g., Location Area Update procedure) in order to attach to disparate wireless networks. Mobile 510 can handover to a second RAN B 545 managed by a second network platform B 540; links 549 and 547 communicate data and control among mobile 510 and RAN B 545, and network platform B 540 and RAN B 545. In an aspect, the second wireless network can boost service coverage and improve bandwidth utilization in the first network, with ensuing improved operation of both mobile 510 and device 520. It should be appreciated that RAN A 535 and RAN B 545 can utilize disparate RF bands, either licensed or unlicensed, and utilized disparate telecommunication technology; for example, RAN A 535 can utilize 3GPP LTE technology while RAN B 545 can exploit WiFi or femto cell technology.

In an aspect of system 500, a processor (not shown) can provide at least in part the functionality of substantially any component within mobile 510, while a memory (not shown) can retain data structures, code instructions, and algorithms related to such functionality; such contents can be utilized by the processor.

Figure 6:
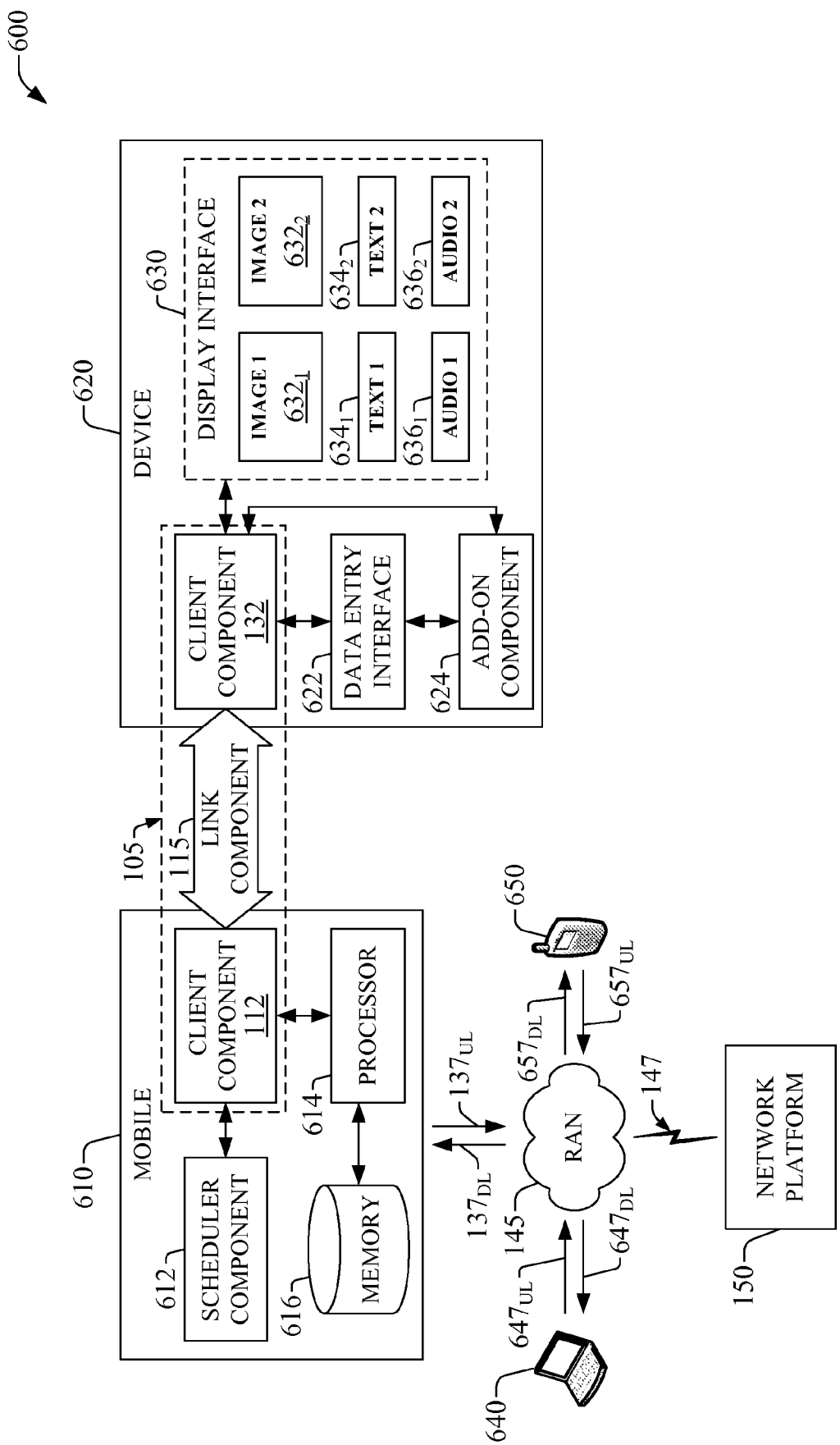
FIG. 6 is a block diagram of an example system that exploits a mobile operation extension interface to relay communication(s) among multiple parties in accordance with aspects disclosed in the subject specification.

FIG. 6 is a block diagram of an example system 600 that exploits a mobile operation extension interface 105 to relay communication(s) among multiple parties. Mobile 610 extends mobile operation to device 620 via an extension interface 105 that, as discussed above, can comprise a client component 112 that resides in mobile 610 and a client component 132 within device 620, the client components 112 and 132 mutually and functionally connected through link component 115. Subscriber station 640 (e.g., a portable personal computer) can exploit wireless links $647_{UL}$ and $647_{DL}$ to communicate via RAN 145 with network platform 150 and establish a telecommunication with mobile 610. In addition, mobile station 650 can also establish a communication with mobile 610 and join a voice or data session underway among subscriber station 640 and mobile 610. Mobile station 650 communicates through RAN 145, via wireless links $657_{UL}$ and $657_{DL}$, with network platform 150, which can administer at least in part communication with mobile 610.

Within example system 600, each party in a multi-party call (e.g., a voice session or data session) can exploit substantially all resources available to the user equipment utilized for communication. For example, a videoconference can be established: Mobile station 640 can exploit a webcam to convey images in addition to sound. Likewise, mobile station 650 can utilize a built-in camera to send images in addition to sound. Moreover, mobile 610 can extend mobile operation to device 620 via an extension interface 105 in accordance with aspects of the subject innovation, and exploit audiovisual resources associated with device 620 (e.g., a personal computer). Once mobile operation has been extended to device 630, mobile 610 can serve as a pass-through element, and relay traffic to device 620. In an aspect, client component 112 manages or operates a scheduler component 612 that schedules traffic to device 620 in accordance to specific quality of service (e.g., traffic handling priority, guaranteed bitrate, minimum bitrate, minimum tolerable latency, maximum bit error or packet loss rate . . . ) associated with subscriber station 640 or mobile station 650. Scheduler component 612 can utilize substantially any scheduling techniques such as round robin, or proportionally fair. To facilitate scheduler component 612 operation, three-way communication among mobile 610, subscriber station 640 and mobile station 650 can be implemented within a multiple-input multiple-output (MIMO) mode of operation. A serving base station within RAN 145 can schedule disparate antenna subsets within mobile 610 for traffic and control communication to and from subscriber station 640 and mobile station 650. It is noted that scheduler component 612 can reside at least in part within client component 112.

With respect to device 620, client component 132 can process and route information carried by data packets received from mobile 610 to a display interface 630, which can render visual or aural indicia to deliver the received information to an end user. For instance, display interface 630 can (i) broadcast images associated with subscriber station 640 (e.g., image 1 $632_1$) or mobile station 650 (e.g., image 2 $632_2$), such as images of a lecture hall, conference room, outdoor camp, etc., wherein the received data originates; (ii) display textual information associated with traffic conveyed by subscriber station 640 (e.g., text 1 $634_1$) or mobile station 650 (e.g., text 2 $634_2$), the textual information can be presented in accordance with various gestures, like sideways scrolling text, scroll-down text, static rendering of text, etc.; and (iii) deliver sound associated with subscriber station 640 (e.g., audio 1 $636_1$) or mobile station 650 (e.g., audio 2 $636_2$). It is to be noted that displayed information and indicia associated thereof can vary based at least in part on the content to be displayed and the nature of the call. In addition, a data entry interface 622 can facilitate generation of data to be conveyed, via client component 132, to mobile 610 to be then relayed to either subscriber station 640 or mobile station 650.

In an aspect, data packets received from mobile 610 can be processed by add-on component 624 prior to delivery to an end user through display interface 630. It is noted that the add-component 624 can reside at least in part within client component 132 even though it is illustrated as external thereto. Data generated via data entry interface 622 can be processed prior to communication to mobile 610 via client component 132 for further communication to subscriber station 640 or mobile station 650. For example, add-on component 624 can translate received text or voice so as to deliver information in a suitable language for an end user of device 630 or subscriber that operate subscriber station 640 or mobile station 650. Additionally, add-on component 624 can generate a graphical rendition (e.g., imagery abstraction, or sign language) of the received text or voice to facilitate comprehension of conveyed information. In an aspect, AI or machine learning techniques can be employed to generate such a graphical rendition. As another example, add-on component 624 can convert text to voice, or vice versa, in order to mitigate possible aural impairment(s) of end user of device 630.

In another aspect of the subject innovation, to ease bandwidth and mitigate latency issues that may arise as a result of a rich traffic communication among the parties of the three-way call (e.g., a voice session or data session), an offloading network (e.g., RAN B 545 and network platform B 540; not shown in FIG. 6) can be employed to transport traffic to and from one of mobile station 650 or subscriber station 640. In another aspect, telecommunication among multiple parties can also be established, and example system 600 can be exploited for communication among more than three wireless devices. In an alternative or additional scenario, a wired device that utilizes a landline for telecommunication can utilize a wire link to connect to a telephony network (e.g., telephony network(s) 160) to participate in a multi-party communication in example system 600.

It should be appreciated that mobile 610 can include substantially any component comprised in embodiments 310, 410, and 510 for a mobile, and exploit substantially all associated functionality of such components. As an example, mobile 610 can include plug-and-play component 312, which can facilitate multi-party communication (e.g., a videoconference, consultation with a customer service representative . . . ) in accordance with aspects described above through utilization of substantially any device with a display interface and a data entry interface 622, like an airport internet kiosk.

Additionally, processor 614 can provide at least in part the functionality of substantially any component within mobile 610, while memory 616 can retain data structures, code instructions, and algorithms related to such functionality; such contents can be utilized by processor 614. Increased complexity of multi-way communication can be managed by multi-processor computing platform within mobile 610. With respect to device 620, a processor (not shown) and a memory (not shown) can provide at least a portion of the functionality of substantially all components within device 620.

In view of the example systems described above, example methodologies that can be implemented in accordance with the disclosed subject matter can be better appreciated with reference to flowcharts in FIGS. 7-14. For purposes of simplicity of explanation example methodologies, or methods, are presented and described as a series of acts; however, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram, or interaction diagram. Moreover, not all illustrated acts may be required to implement a methodology in accordance with the subject specification. Additionally, it should be further appreciated that the methodologies disclosed hereinafter and throughout this specification are capable of being stored on an article of manufacture to facilitate transporting and transferring such methodologies to computers for execution by a processor or for storage in a memory.

Figure 7:
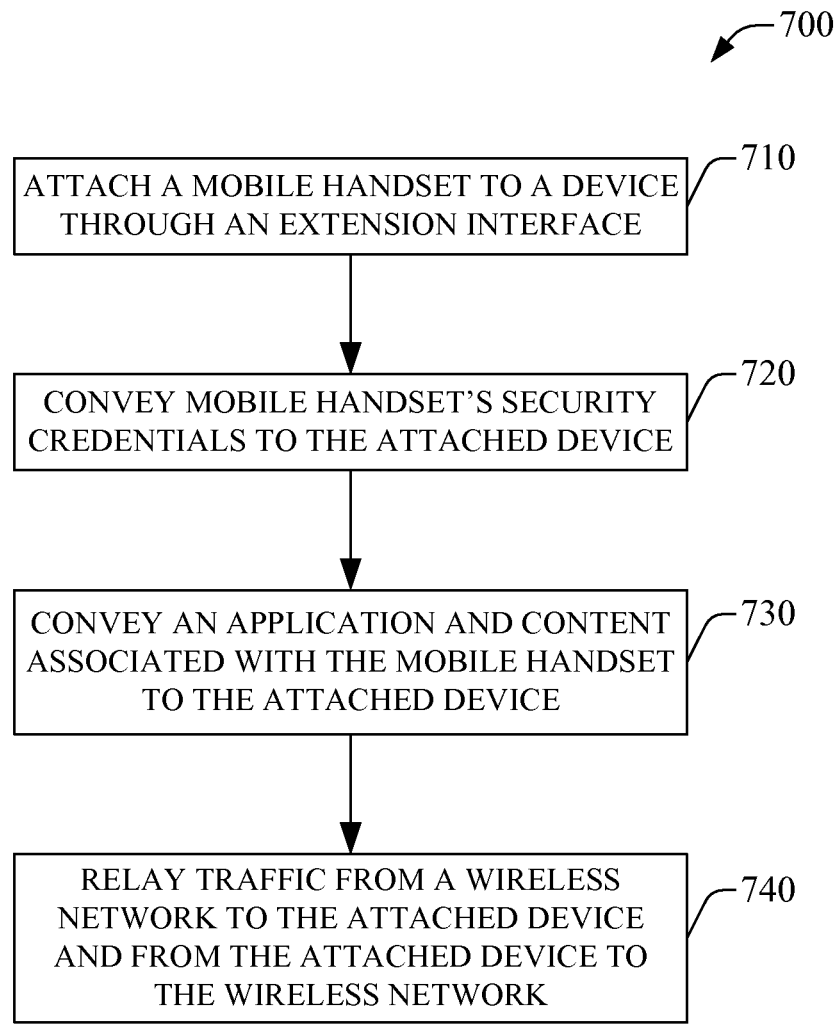
FIG. 7 is a flowchart of an example method for extending mobile handset operation to a device according to aspects described in the subject specification.

FIG. 7 is a flowchart of an example method 700 for extending mobile handset operation to a device according to aspects described in the subject specification. At act 710, a mobile handset is attached to a device through an extension interface (e.g., extension interface 105). In an aspect, the extension interface can include a client component residing in the mobile handset, a client component residing in the device, and a link component that connects both client components. The device is typically an electronic device with a set of functionalities. Attachment can proceed according to device-specific protocol(s), such protocols can be stored in a memory in the mobile handset. Attachment protocol(s) can be based at least in part on a handshake procedure including at three-step mechanism: Acknowledge-Request-Grant, wherein connectivity is acknowledged by the mobile handset and device, a request to attach is set forth by the mobile handset, and the attachment is granted by the device. Acknowledgement step can include recognition of the device, e.g., through collection of a serial number or product code that identifies the device, and download of device-specific attachment instructions from a network, e.g., ISP network(s). Moreover, acknowledgement can include powering-up the device. To facilitate attachment, device manufactures can provide attachment protocols to network operator(s).

At act 720, mobile handset's security credentials (e.g., SIM contents) are conveyed to the attached device. Such security credentials can enable a mobile service provider to recognize the device as part of a serving wireless network. In an aspect, security credentials are conferred to the device for a finite time interval, which typically is the time span during which the mobile handset and device are attached. At act 730, an application (internet protocol (IP) television client, video- and sound-streaming client . . . ) and content (e.g., files, passwords) associated with the mobile handset are conveyed to the attached device. It is noted that the application and content associated with the mobile handset can reside within the mobile or it can be stored in an in-the-cloud server (e.g., a server within network platform 150, ISP network 170, LAN 180) to which the mobile has access. In an aspect, the application is conveyed as a source-code bundle for the attached to generate a suitable executable application.

At act 740, traffic from a wireless network to the attached device, and from the attached device to the wireless network, is relayed. The mobile handset serves are pass-through relay.

Figure 8:
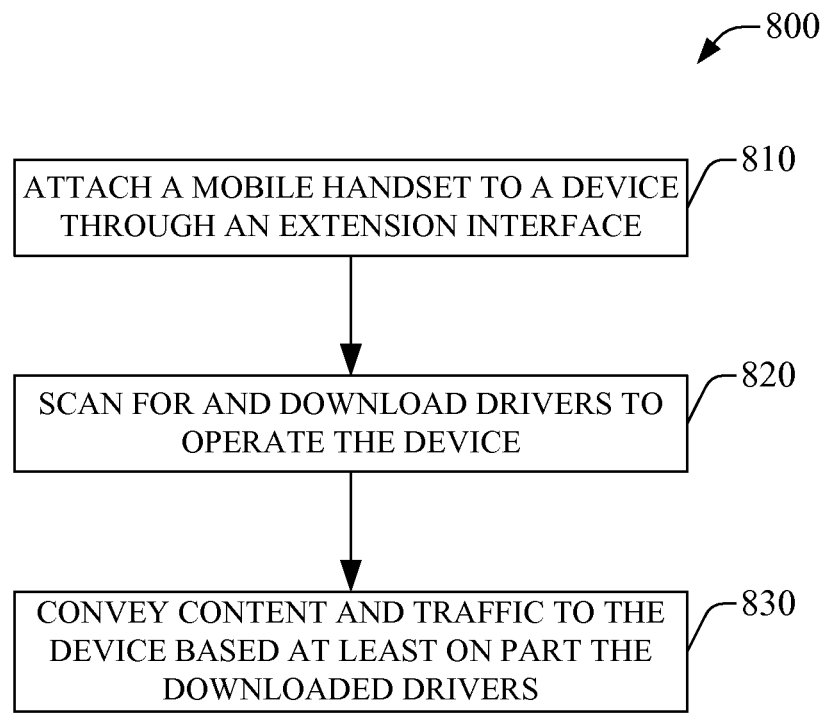
FIG. 8 displays a flowchart of an example method for conveying content to a device attached to a mobile handset through an extension interface according to aspects described in the subject innovation.

FIG. 8 displays a flowchart of an example method 800 for conveying content to a device attached to a mobile handset through an extension interface according to aspects described in the subject innovation. At act 810, a mobile handset is attached to a device through an extension interface. It is to be noted this act is substantially the same as act 710 in example method 700. At act 820, drivers to operate the device are scanned for and downloaded when encountered. A wireless network that provides mobile service can facilitate access to a wide-area network (e.g., ISP network 170) to scan, or search, for the drivers and retrieve them when suitable for device operation. In an aspect, a plug-and-play component within the mobile handset can conduct the scanning and downloading. At act 830, content and traffic are conveyed to the device based at least in part on the downloaded drivers.

Figure 9:
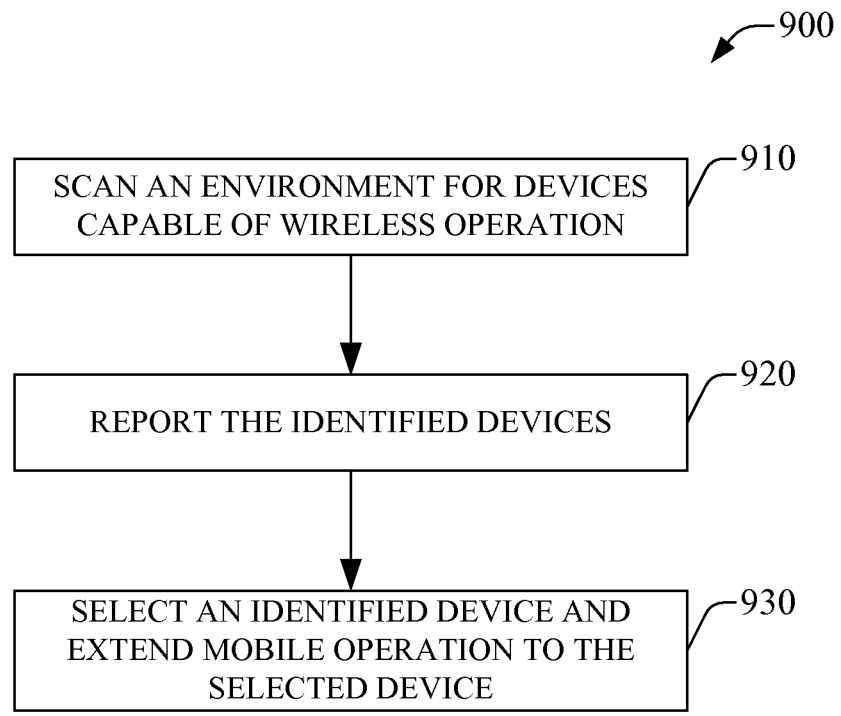
FIG. 9 is a flowchart of an example method for extending mobile operation to available devices with wireless capability according to aspects disclosed herein.

FIG. 9 is a flowchart of an example method 900 for extending mobile operation to available devices with wireless capability according to aspects disclosed herein. At act 910, an environment is scanned for devices capable of wireless operation. It is noted that the devices can generally effect their functionality without reliance on wireless operation, with wireless operation enabled for predetermined purposes or within an on-demand basis. In an aspect, the environment can be a confined area (e.g., a building, or a building and a portion of an outdoor area). A mobile handset performs the scans. At act 920, identified devices are reported. Such reporting can be effected through a reporting component within the mobile handset. At act 930, an identified device is selected and mobile operation is extended to the selected device. In an aspect, extension of mobile operation can be implemented through one or more acts of example method 700.

Figure 10:
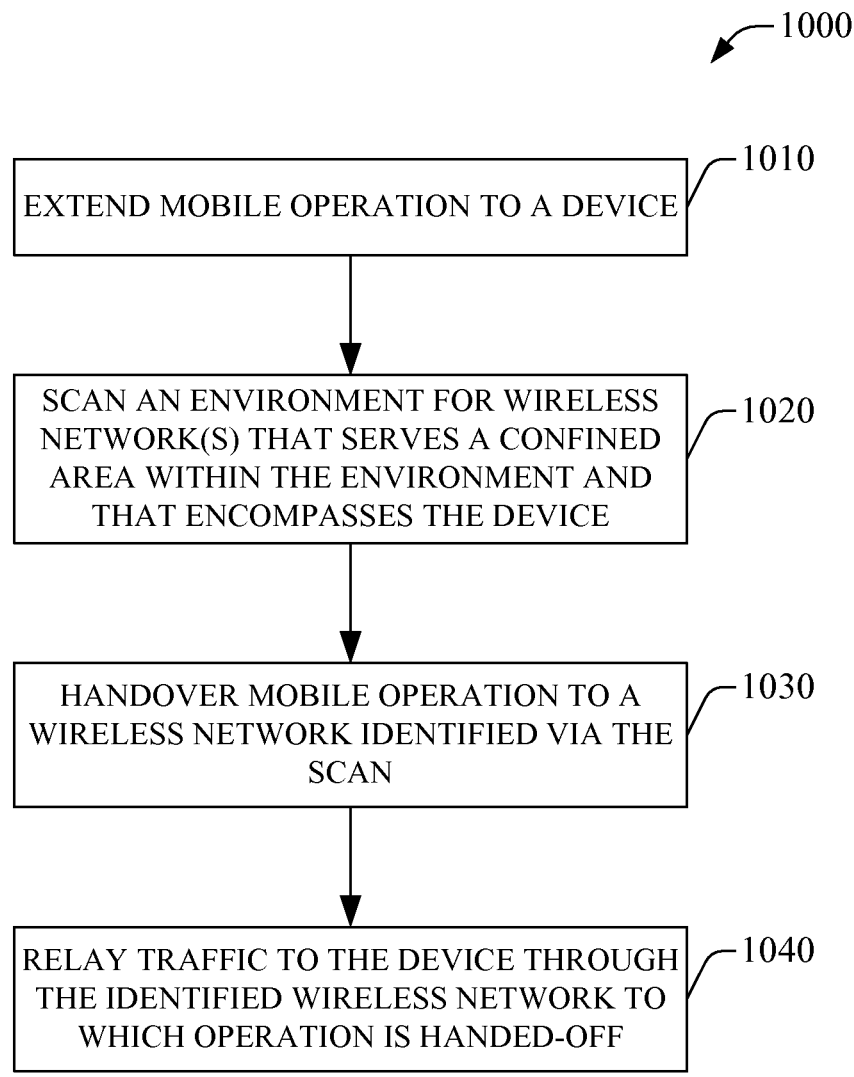
FIG. 10 is a flowchart of an example method for utilizing an alternative or offloading network for extension of mobile operation to a device.

FIG. 10 displays a flowchart of an example method 1000 for utilizing an alternative or offloading network for extension of mobile operation to a device. At act 1010, mobile operation is extended to a device. The device is typically an electronic device with a set of specific enabled or capable functionalities. In an aspect, extension of mobile operation can be implemented through one or more acts of example method 700. At act 1020, an environment is scanned for wireless network(s) that serves a confined area within the environment and that encompasses the device. In another aspect, service through such a network can be received through local access points, or HNBs. At act 1030, mobile operation is handed-over to a wireless network identified via the scan. It should be appreciated that such handover can at least boost quality of service to a mobile handset that extends mobile operation to the device, and offload a serving network. A handover component can implement hand-off according to a procedure compatible with the wireless technology utilized by the identified wireless network. At act 1040, traffic is relayed to the device through the identified wireless network to which mobile operation is handed-off.

Figure 11:
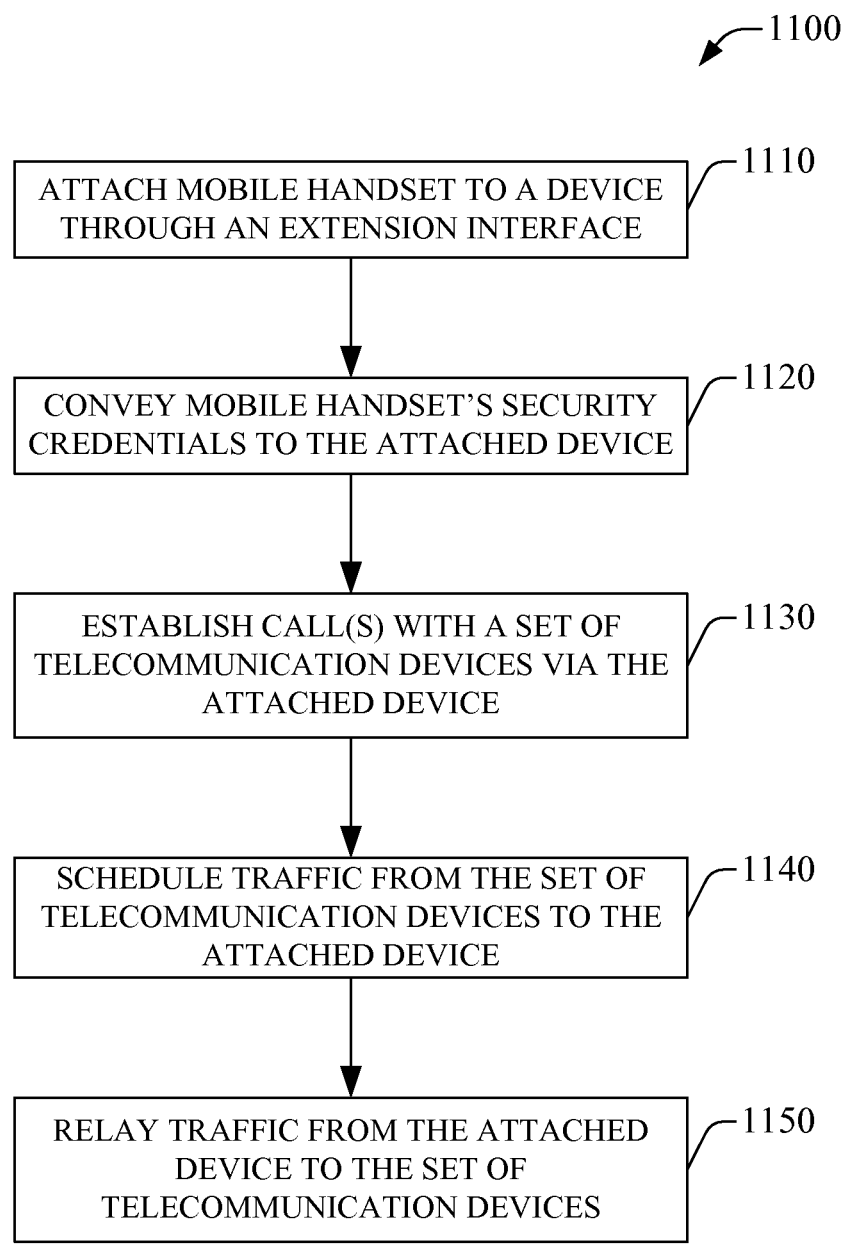
FIG. 11 is a flowchart of an example method for exploiting extension of mobile operation of a device to conduct a multi-part call according to aspects disclosed herein.

FIG. 11 presents a flowchart of an example method 1100 for exploiting extension of mobile operation of a device to conduct a multi-part call according to aspects disclosed herein. Call can include a data session or a voice session. At act 1110, a mobile handset is attached to a device through an extension interface. At act 1120, mobile handset's security credentials are conveyed to the attached device. It is noted that acts 1110 and 1120 are substantially the same as acts 710 and 720, respectively, in example method 700. At act 1130, call(s) is established with a set of telecommunication devices, which can include wireless and wired devices, via one of the attached device. Call can be initiated by utilizing a component that emulates handset operation (e.g., emulation component 234). In an alternative or additional aspect, a call can be established through the mobile handset through which mobile operation is extended to the device. At act 1140, traffic from the set of telecommunication devices to the attached device is scheduled. Such scheduling can be based on predetermined QoS parameters associated with operation and traffic of one or more of the telecommunication devices in the set of devices. Additionally, control information conveyed through a random access networks that sustains communication with the mobile handset can be employed for scheduling traffic. At act 1150, traffic is relayed from the attached device to the set of telecommunication devices, and vice versa.

Figure 12:
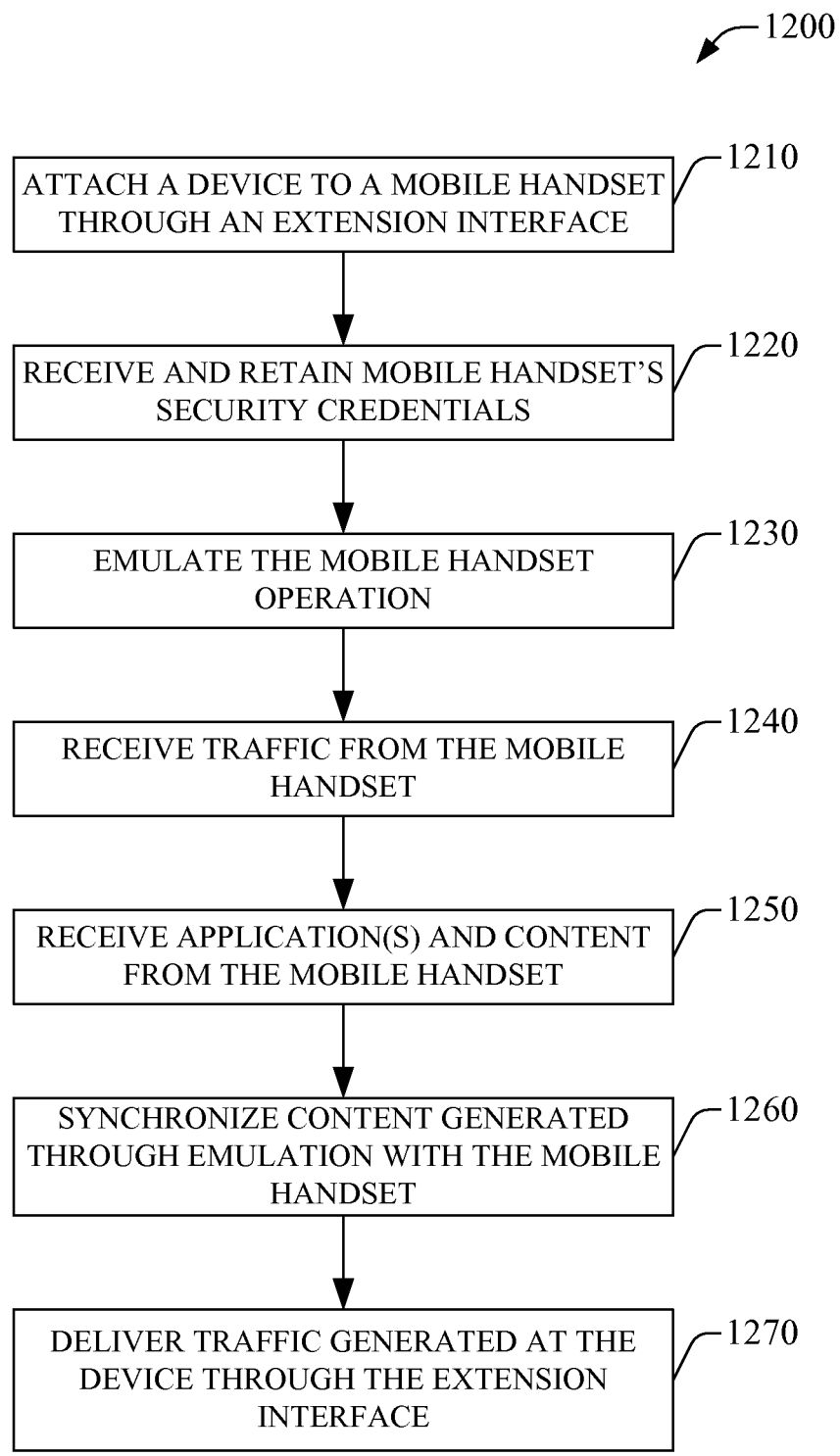
FIG. 12 is a flowchart of an example method for exploiting mobile service through a mobile handset extension interface according to aspects described in the subject specification.

FIG. 12 is a flowchart of an example method 1200 for exploiting mobile service through a mobile handset extension interface according to aspects described in the subject specification. At act 1210, a device is attached to a mobile handset through an extension interface. In an aspect, the device is a non-networked electronic device that implements its one or more functionalities through a set of components to which a processor, assisted through a memory component(s), confers at least part of the device's components functionalities. At act 1220, mobile handset's security credentials are received and retained. In an aspect, the security credentials form a set of one or more entities. Such credentials are retained for a finite time span that expires when extension interface no longer provides mobile operation (e.g., logic condition of interface is set to non-operational). At act 1230, mobile handset operation is emulated; for example, and emulation component within the attached device can facilitate substantially all operational features of the mobile handset. At act 1240, traffic is received from the mobile handset; the traffic is provided through a wireless network that serves the mobile. At act 1250, application(s) and content are received from the mobile handset. Application(s) can be received as a source-code package that the device can manipulate to generate a device-specific application that emulates the application on the mobile handset. At act 1260, content generated through emulation is synchronized with the mobile handset, thus updated content remains in the attached mobile handset. At act 1270, traffic generated at the device, which can be a part of emulation of the mobile handset, can be delivered through the extension interface. Traffic is typically delivered to a party that maintains a call with the mobile handset, the call effected through the device. It should be appreciated that maintaining a call through the device allows a subscriber to exploit substantially all operational resources of the device (e.g., substantive display real estate, sound and video capabilities, computing strength, and so on).

Figure 13:
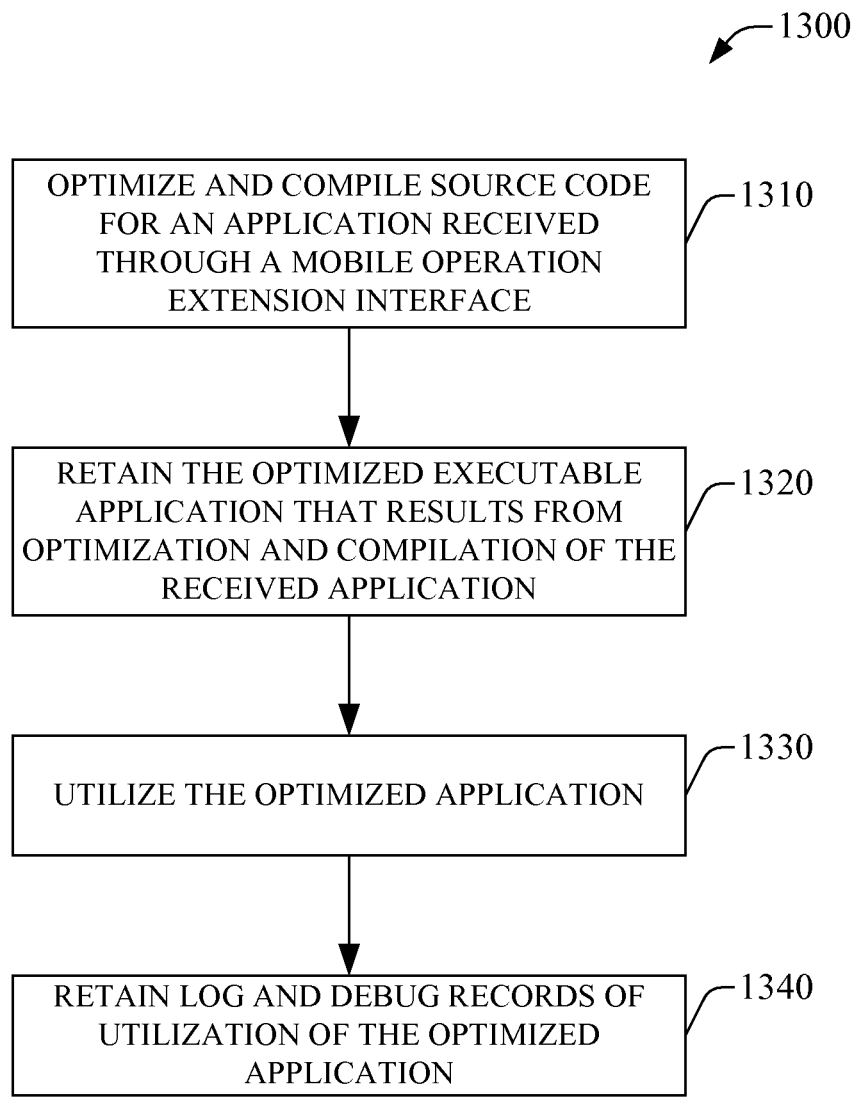
FIG. 13 is a flowchart of an example methodology for generating and employing a device-specific application from a mobile-specific application when mobile operation is extended to the device according to aspects of the subject innovation.

FIG. 13 is a flowchart of an example methodology 1300 for generating and employing a device-specific application from a mobile-specific application when mobile operation is extended to the device according to aspects of the subject innovation. At act 1310, source code for an application received through a mobile operation extension interface is optimized and compiled. It should be appreciated that act 1310 generates a device-specific application. In an aspect, source code can be object-oriented, and optimization can include modification of structures (e.g., modules, objects, classes, and metadata) associated with the received source code. At act 1320, the optimized executable application that results at least in part from optimization and compilation of the received source code is retained. At act 1330, the optimized application is utilized. At act 1340, log and debug records of utilization of the optimized application are retained. It is noted that log and debug records associated with application optimization and compilation can also be stored.

Figure 14:
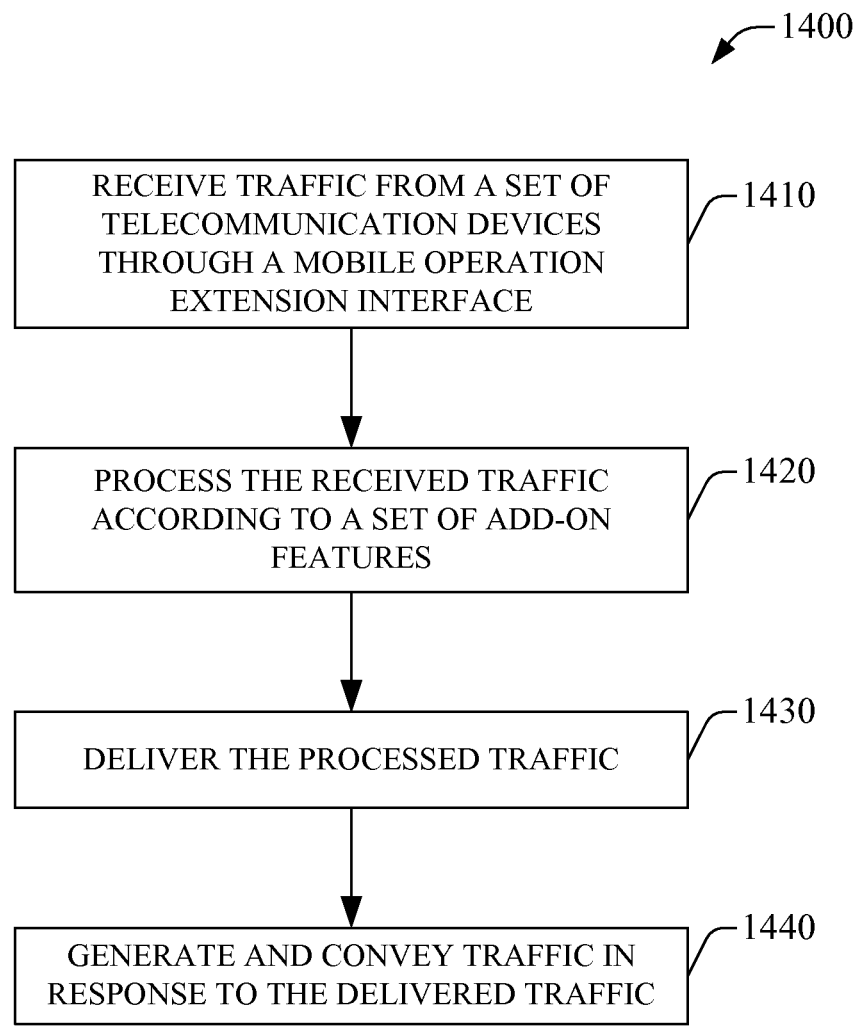
FIG. 14 is a flowchart of an example methodology for manipulating and delivering traffic through a mobile operation extension interface according to aspects of the subject innovation.

FIG. 14 is a flowchart of an example methodology 1400 for manipulating and delivering traffic through a mobile operation extension interface according to aspects of the subject innovation. In an aspect, a device (e.g., device 620) can implement example methodology 1400. At act 1410, traffic is received from a set of telecommunication devices through a mobile operation interface. The mobile operation interface functionally connects a mobile handset to the device, through a link component and at least two client components, one that resides in the mobile handset (e.g., mobile 110) and another that resides in the device.

At act 1420, the received traffic is processed according to a set of add-on features. An add-on component (e.g., add-on component 624) can provide one or more of the add-on features; e.g., translation, voice-to-text and text-to-voice conversion, voice recognition and association of specific, customized add-on features like uploading a particular address-book for an end user whom his or her voice has been recognized, etc. At act 1430, the processed traffic is delivered. An end user typically receives the traffic through a display interface, which can convey the traffic via various gestures (e.g., visual, aural, tactile like touch-based actuation . . . ) to an end user of the device.

At act 1440, traffic or data is generated in response to the delivered, previously processed traffic. Generation of data can be assisted through a data entry interface (e.g., data entry interface 624). Data generation can be (a) explicit or (b) implicit. In the former case, an end user conveys the information or content to be delivered, the content can be processed prior to delivery via the extension interface. In (b), preset information can be delivered when an end-user interacts in predetermined manners with the data entry interface (e.g., preset touch keys), or when the device that generates and conveys the traffic infers that predetermined information is to be communicated. For example, in case an alarm or substantially any sound(s) that can be assessed (e.g., via an intelligence component utilizing AI techniques) to be an indicator of end-user distress. As another example, when generated, or collected, images convey an emergency situation, a distress call can be conveyed implicitly. In particular, a bank employee can extend mobile operation to a closed-circuit camera at a time of a robbery, and an ensuing distress call can be generated and conveyed without explicit, and potentially fatal, interaction of the bank employee with his or her mobile handset.

Figure 15:
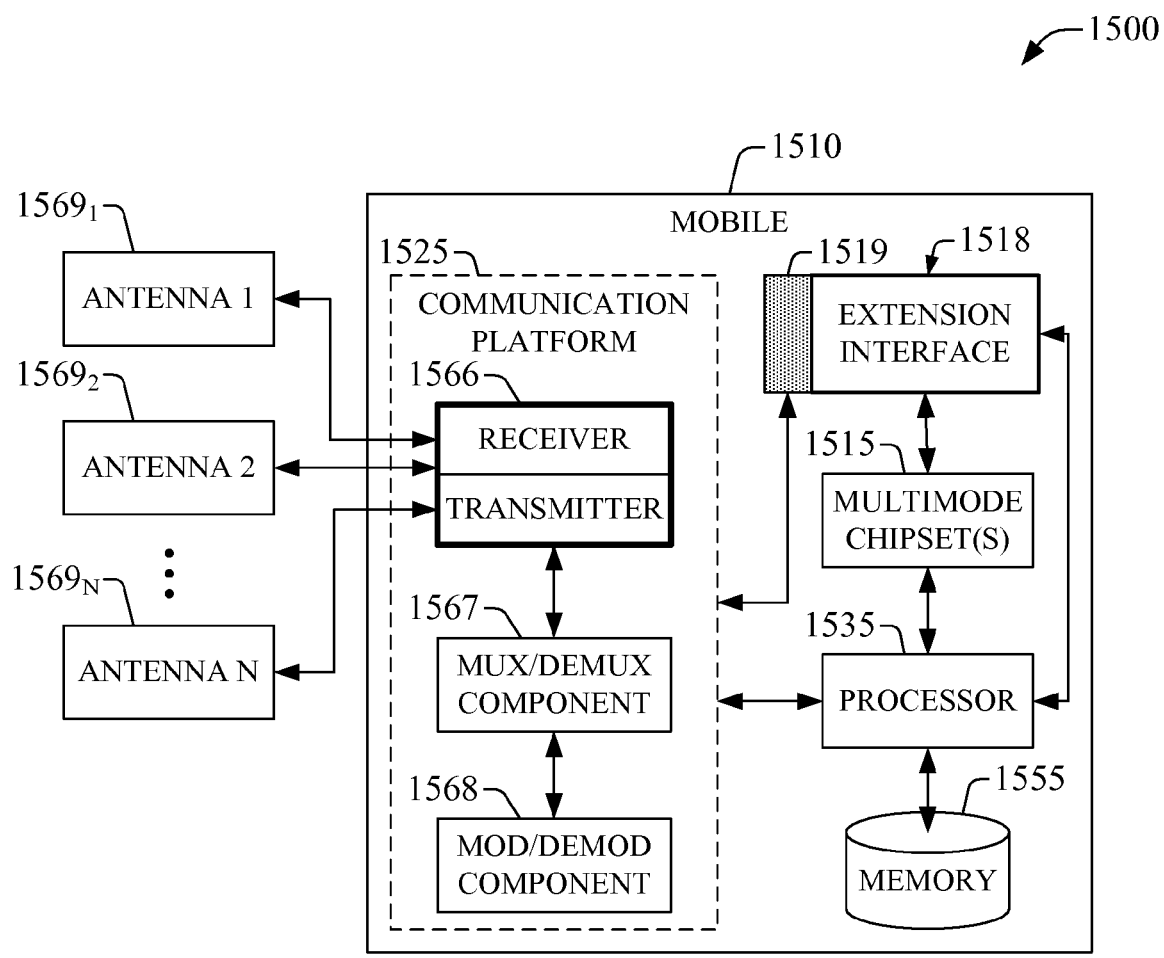
FIG. 15 is a block diagram of an example embodiment of a mobile that operates in accordance with aspects disclosed in the subject specification.
Figure 16:
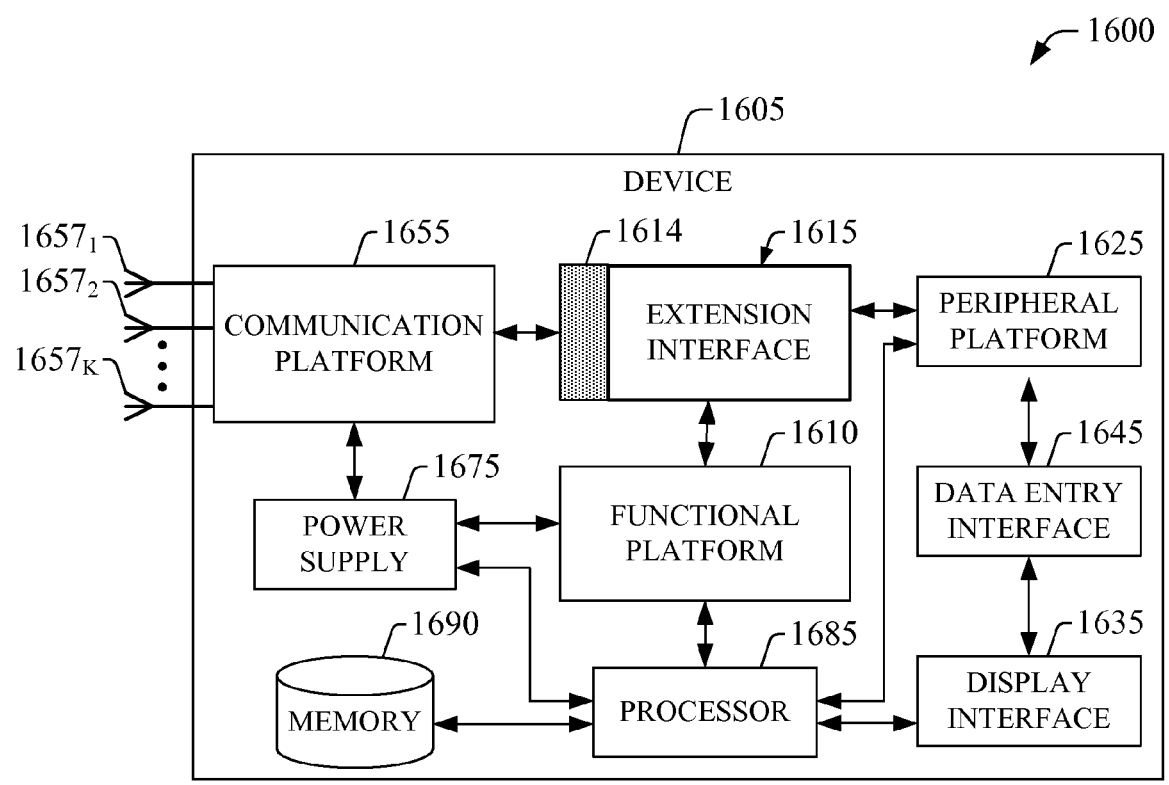
FIG. 16 presents a block diagram of an example embodiment of a device to which mobile operation can be extended in accordance with aspects described herein.

To provide further context for various aspects of the subject specification, FIG. 15 illustrates a block diagram of an example embodiment 1500 of a mobile 1510 that can be attached to a device (e.g., device 130) to extend mobile operation through an extension interface (e.g., extension interface 105) in accordance with aspects described herein. Additionally, FIG. 16 presents a block diagram of a device to which mobile operation can be extended in accordance with aspects described herein.

In mobile 1510, which can be a multimode access terminal, a set of antennas $1569_1$-$1569_N$ (N is a positive integer) can receive and transmit signal(s) from and to wireless devices like access points, access terminals, wireless ports and routers, and so forth, that operate in a radio access network, e.g., RAN 145. It should be appreciated that while antennas $1569_1$-$1569_N$ are a part of communication platform 1525, which comprises electronic components and associated circuitry that provide for processing and manipulation of received signal(s) and signal(s) to be transmitted. In an aspect, communication platform 1525 includes a receiver/transmitter 1566 that can convert signal from analog to digital upon reception, and from digital to analog upon transmission. In addition, receiver/transmitter 1566 can divide a single data stream into multiple, parallel data streams, or perform the reciprocal operation; such operations typically conducted in various multiplexing schemes. Functionally coupled to receiver/transmitter 1566 is a multiplexer/demultiplexer (mux/demux) component 1567 that facilitates manipulation of signal in time and frequency space. Electronic mux/demux component 1567 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 1567 can scramble and spread information (e.g., codes) according to substantially any code; e.g., Hadamard-Walsh codes, Baker codes, Kasami codes, polyphase codes, and so on. A modulator/demodulator (mod/demod) component 1568 is also a part of communication platform 1525, and can modulate information according to various modulation techniques, such as frequency modulation (e.g., frequency-shift keying), amplitude modulation (e.g., M-ary quadrature amplitude modulation (QAM), with M a positive integer; amplitude-shift keying (ASK)), phase-shift keying (PSK), and the like. In an aspect of embodiment 1500, mod/demod component 1568 is functionally coupled to mux/demux component 1567.

In embodiment 1500, multimode operation chipset(s) 1515 allows mobile 1510 to operate in multiple communication modes in accordance with disparate technical specification for wireless technologies. In an aspect, multimode operation chipset(s) 1515 utilizes communication platform 1525 in accordance with a specific mode of operation. In another aspect, multimode operation chipset(s) 1515 can be scheduled to operate concurrently (e.g., when N>1) in various modes or within a multitask paradigm.

Extension interface 1518 facilitates extension of mobile operation to a device (e.g., device 130) in accordance with aspects described in the subject specification. Extension interface 1518 can include a client component (e.g., client component 112) and at least a portion of a link (e.g., link component 115) that can provide, at least in part, both logical (e.g., functional) and physical attachment to the device.

Mobile 1510 also includes a processor 1535 configured to confer functionality, at least in part, to substantially any electronic component within mobile 1510, in accordance with aspects of the subject innovation. As an example, processor 1535 can be configured to execute, at least in part, instructions in multimode operation chipset(s) that afford multimode communication through mobile 1510 like concurrent or multitask operation of two or more chipset(s). As another example, processor 1535 can facilitate mobile 1510 to receive traffic (e.g., various data flows) through extension interface 1518, and relay such traffic via communication platform 1525. As yet another example, processor 1535 can receive synchronization indications via extension interface 1518 to maintain content synchronized with operation performed in a device (not shown) attached to mobile 1510 via extension interface 1518. A link dock 1519 can be operationally coupled to extension interface 1519 to facilitate attachment of link component(s) that are at least a part of extension interface 1519. It should be appreciated that processor 1535 can store (e.g., in cache memory) at least temporarily traffic received from either extension interface 1518 or communication platform 1525, or both. Moreover, processor 1535 facilitates mobile 1510 to process data (e.g., symbols, bits, or chips) for multiplexing/demultiplexing, modulation/demodulation, such as implementing direct and inverse fast Fourier transforms, selection of modulation rates, selection of data packet formats, inter-packet times, etc. Memory 1555 can store data structures (e.g., metadata); code structure(s) (e.g., modules, objects, classes, procedures) or instructions; network or device information like policies and specifications, attachment protocols; code sequences for scrambling, spreading and pilot (e.g., reference signal(s)) transmission; frequency offsets, LACs or substantially any other cell IDs, and so on.

In embodiment 1500, processor 1535 is functionally coupled (e.g., through a memory bus) to memory 1555 in order to store and retrieve information necessary to operate and/or confer functionality, at least in part, to communication platform 1525, multimode operation chipset(s) 1515, extension interface 1518, and other operational aspects of multimode user equipment 1510.

FIG. 16 presents a block diagram of an example embodiment 1600 of a device that can operate in accordance with aspects described herein. Device 1605 includes a functional platform 1610 that comprises a set of components that provide at least in part specific functionality of the device in accordance with at least one device aspect described herein. Additionally, device 1605 includes an extension interface 1615 in accordance with aspects described herein. A link dock 1614 can facilitate to link (e.g., through a link component 115) device 1605 to a mobile handset (not shown) attached thereto through the extension interface 1615. Link dock 1614 can include jacks for various connectors of various types: Ethernet, USB, GPIB, RS-232, FireWire, optical, and so forth.

Moreover, device 1605 can include in an aspect a communication platform 1655 that can provide wireless communication capabilities in addition to connectivity of device 1605 through wired links (e.g., Ethernet connection to server(s); not shown). With respect to wireless capability, communication platform 1655 includes substantially the same component and associated functionality as communication platform 1525 in mobile 1510. Communication platform 1655 is functionally connected to a set of K antennas $1657_1$-$1657_K$, (K is a positive integer) that can provide MIMO communication.

A peripheral component 1625 can include, or facilitate connection to, additional devices such as printer(s), media player(s), wireless router(s), biometrics touch-pad(s), etc. In an aspect, peripheral component can be functionally coupled to extension interface 1615 and thus mobile operation can also be extended to peripheral devices (e.g., traffic associated with a videoconference can be recorded in a DVD (Digital Versatile Disc) recorder which can be a peripheral device connected to device 1605.

Additionally, the display interface 1635 can be a part of functional platform 1610 (e.g., when device 1605 is a PC, a television, a backprojector component, a data projector . . . ), and it can also display functions that control functionality of device 1605, or reveal operation conditions thereof (e.g., light-emitting-diode (LED) indicator(s) of mobile operation attachment). For example, display interface 1635 can display at least one of a graphical user interface to exploit emulation of mobile handset operation in device 1605, or traffic or content received from a mobile handset attached to the device through extension interface. In an aspect, display interface 1635 can be a liquid crystal display (LCD), a plasma panel, a monolithic thin-film based electrochromic display, and so on.

It should be appreciated that device 1605 can include a data entry interface that can allow an end user to command device 1605 via configuration of functional platform 1610, interact with an attached mobile handset (not shown) through device 1605, and generate data associated with communication through an attached mobile handset.

Power supply 1675 can power-up device 1605 and substantially any component included thereon. It should be appreciated that alternative or additional embodiments 1600 may not include power supply 1675 and be powered via an attachment link associated with extension interface 1615.

Device 1605 also includes memory 1690 functionally coupled to processor 1685, and can store data structures, codes structures and instructions, and substantially any type of software or firmware that processor 1685 can execute to provide functionality associated with functional platform 1610.

Various aspects or features described herein may be implemented as a method, apparatus, or article of manufacture using standard programming and/or engineering techniques. In particular, the aspects or features can be implemented through program modules stored in a memory and executed by a processor, and/or other combination of hardware and software, e.g., firmware. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," and substantially any other information storage component relevant to operation and functionality of a component, refer to "memory components," or entities embodied in a "memory" or components comprising the memory. For example, information relevant to operation of various components described in the disclosed subject matter, and that can be stored in a memory, can comprise, but is not limited to comprising, subscriber information; femto cell configuration (e.g., devices served by a femto AP; access control lists, or white lists) or service policies and specifications; privacy policies; add-on features, geographical location tolerances, and so forth. It will be appreciated that the memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of systems and methods that provide advantages of the subject innovation. It is, of course, not possible to describe every conceivable combination of components or methodologies for purposes of describing the subject innovation, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
a memory to store computer-executable instructions; and
a processor, communicatively coupled to the memory, that facilitates execution of the computer-executable instructions to perform operations, comprising:
   facilitating a connection between a device and a mobile device;
   facilitating conveyance of identification credentials from the mobile device to the device, wherein the identification credentials are secured using a voice recognition and an iris recognition; and
   facilitating a manipulation of a function associated with the device via a command received from the mobile device,
wherein the identification credentials are valid for a predetermined time span and expire in response to the connection between the mobile device and the device being determined to have become logically disconnected, and wherein the identification credentials received from the mobile device are revocable by a revocation command issued by the device after expiry of the identification credentials.

2. The system of claim 1, wherein the operations further comprise facilitating forwarding content from the mobile device to the device via the connection established between the mobile device and the device.

3. The system of claim 2, wherein the operations further comprise facilitating forwarding first traffic, received from a wireless radio access network device, from the mobile device to the device.

4. The system of claim 3, wherein the operations further comprise facilitating forwarding of second traffic from the device, via the mobile device, to the wireless radio access network device in response to reception of the first traffic by the device.

5. The system of claim 4, wherein the connection between the mobile device and the device is a wired link.

6. The system of claim 5, wherein the wired link includes an interface to a local area network.

7. The system of claim 1, wherein the device is an electronic appliance.

8. The system of claim 1, wherein the identification credentials include license information for an application sent from the mobile device to the device.

9. The system of claim 1, wherein the operations further comprise facilitating a search of a wireless radio access network device for a driver capable of facilitating communications with the device, facilitating a download of the driver from the wireless radio access network device, and facilitating storage of the driver to a storage device associated with the mobile device.

10. The system of claim 1, wherein the operations further comprise monitoring communication between the device and the mobile device as a function of a driver determined by the mobile device to be capable of the monitoring.

11. The system of claim 1, wherein the operations further comprise scanning for wireless signals to identify a set of wireless-capable devices.

12. The system of claim 1, wherein the operations further comprise receiving a report of a set of wireless-capable devices determined based on a scan for wireless signals conducted by the mobile device.

13. The system of claim 1, wherein the operations further comprise scheduling traffic from a set of telecommunication devices, and wherein the traffic is relayed between the set of telecommunication devices and the device via the mobile device.

14. The system of claim 1, wherein the operations further comprise detecting available wireless network within an environment that includes the device, and transferring provision of service to the mobile device to the available wireless network.

15. A method, comprising:
facilitating, by a system including a processor, conveying security credentials from a mobile handset to a device, wherein the security credentials expire after a defined time period and in response to an extension interface used for the conveying being determined to be logically terminated by a revocation command issued by the device, and wherein the security credentials are secured using finger print recognition and a voice recognition;
facilitating, by the system, forwarding first traffic received from a wireless network device to the device via the mobile handset;
facilitating, by the system, forwarding second traffic from the device to the wireless network device via the mobile handset; and
in response to the first traffic being determined to be forwarded from the wireless network device to the device, controlling, by the system, a function associated with the device based on a mobile handset command issued by the mobile handset.

16. The method of claim 15, further comprising facilitating, by the system, conveying an application and content associated with the mobile handset to the device.

17. The method of claim 16, further comprising:
facilitating, by the system, scanning for and downloading, by the system, a software application that operates the device; and
facilitating, by the system, conveying-content and first traffic to the device based on the software application.

18. The method of claim 17, further comprising:
facilitating, by the system, scanning for another device capable of wireless operation; and
facilitating, by the system, selecting the other device capable of wireless operation and extending mobile operation via the mobile handset to the other device.

19. The method of claim 18, further comprising facilitating, by the system, reporting the other device.

20. The method of claim 18, further comprising:
facilitating, by the system, scanning for a wireless network that serves a confined area that encompasses the device;
facilitating, by the system, transfer of a mobile handset operation to the wireless network device identified based on a result of the scanning; and
facilitating, by the system, relaying the first traffic to the device via the wireless network device to which the mobile handset operation has been transferred.

21. The method of claim 18, further comprising:
facilitating, by the system, establishing a call with a set of telecommunication devices via the mobile handset to the device;
facilitating, by the system, scheduling the first traffic from the set of telecommunication devices via the mobile handset to the device; and
facilitating, by the system, relaying the second traffic from the device via the mobile handset to the set of telecommunication devices.

22. A tangible computer-readable storage medium having computer-executable instructions stored thereon that, in response to execution, cause a computing system including a processor to perform operations, comprising:
conveying, via an extension interface, security credentials associated with a mobile handset to a device, wherein the security credentials are secured using a voice recognition and an iris recognition and expire as a function of the extension interface established between the mobile handset and the device becoming logically disconnected and in response to a command issued by the device;
conveying an application and content associated with the mobile handset to the device;
relaying first traffic from a wireless network device via the mobile handset to the device and second traffic from the device via the mobile handset to the wireless network device; and
utilizing the application and the content conveyed to the device to emulate a function of the mobile handset on the device.

23. A system, comprising:
a memory to store computer-executable instructions; and
a processor, communicatively coupled to the memory, that facilitates execution of the computer-executable instructions to perform operations, comprising:
receiving a wireless service via a mobile, via an extension interface that connects the mobile with a device, initiating a relay of security credentials associated with the mobile to the device, wherein the security credentials are secured using voice recognition and an iris recognition;

revoking the security credentials relayed to the device in response to receiving a revocation command from the device and a determination that a logical termination of a connection between the mobile and the device has occurred, wherein the security credentials are valid for a predetermined time period; and prior to the revoking of the security credentials, receiving other computer-executable instructions from the mobile operable to cause the device to emulate a function of the mobile on the device.

24. The system of claim 23, wherein the operations further comprise facilitating a relay of content from the device to the mobile.

25. The system of claim 23, wherein the operations further comprise facilitating emulation of a mobile operation of the mobile.

26. The system of claim 25, wherein the operations further comprise:
facilitating adaptation of source code for an application received from the mobile; and
facilitating compilation of the source code to generate a device-specific application that executes on the device and utilizes an operational resource of the device.

27. The system of claim 26, wherein the facilitating the adaptation of the source code comprises facilitating access to a memory platform that comprises a data storage device.

28. The system of claim 23, wherein the operations further comprise facilitating synchronization of content generated via emulation of a mobile operation of the mobile.

29. The system of claim 23, wherein the operations further comprise facilitating relaying content to the mobile from the device.

30. The system of claim 23, wherein the operations further comprise facilitating processing of traffic relayed from a set of telecommunication devices via the mobile before the traffic is displayed on the device.

31. The system of claim 30, wherein the traffic includes content converted from a first format to a second format.

32. The system of claim 31, wherein the operations further comprise facilitating revocation of identification credentials received from the mobile in response to a determination that the device has detached from the mobile.

33. A method, comprising:
receiving and retaining a set of security credentials, by a system including a processor, associated with a mobile station, wherein the set of security credentials expire in response to an extension interface established between a device and the mobile station being logically severed and a revocation command generated by the device, wherein the set of security credentials are secured using a plurality of biometric recognitions selected from a group including a voice recognition, an iris recognition, and a finger print recognition, and wherein the set of security credentials are valid for a defined time period;
receiving, by the system, first traffic from the mobile station;
delivering, by the system, second traffic generated at the device via the extension interface; and
based on the second traffic, emulating, by the system, an operation of the device on the mobile station.

34. The method of claim 33, further comprising emulating, by the system, a mobile station operation on the device.

35. The method of claim 34, wherein the emulating includes synchronizing content generated via the emulating of the mobile station operation.

36. The method of claim 35, further comprising receiving, by the system, an application and the content from the mobile station.

37. The method of claim 33, wherein the set of security credentials remain valid for a defined time interval.

38. The method of claim 36, wherein the emulating the mobile station operation on the device comprises:
adapting and compiling source code, by the system, for the application to generate a device-specific optimized application; and
facilitating, by the system, utilization of the device-specific optimized application on the device.

39. The method of claim 38, further comprising retaining, by the system, log records and debug records of utilization of the device-specific optimized application on the device.

40. The method of claim 39, further comprising retaining, by the system, the device-specific optimized application.

41. The method of claim 40, further comprising:
receiving, by the system, the first traffic, delivered via the mobile station, from a set of telecommunication devices;
processing, by the system, the first traffic based at least in part on a set of add-on features;
delivering, by the system, processed traffic to the device; and
generating and conveying, by the system, further traffic to the set of telecommunication devices in response to the processed traffic being determined to have been delivered to the device.

42. The method of claim 38, further comprising: optimizing, by the system, source code, including object-oriented code, for the application including modifying an object associated with the source code for the application.

43. A tangible computer-readable storage medium having computer-executable instructions stored thereon that, in response to execution, cause a computing system including a processor to perform operations, comprising:
receiving and retaining a set of security credentials associated with a subscriber station, wherein the set of security credentials are revoked when an extension interface established between a device and the subscriber station becomes logically disconnected in response to a revocation command generated at the device, wherein the set of security credentials associated with the subscriber station are secured from a plurality of biometric locking mechanisms selected from a group including a voice recognition, an iris recognition, and a finger print recognition, and wherein the security credentials are valid for a defined time period;
receiving first traffic from the subscriber station;
delivering second traffic generated at the device via the extension interface to the subscriber station; and
utilizing the subscriber station to emulate a subscriber station function on the device.

44. The system of claim 1, wherein the system is utilized to convey an application from the device to the mobile device.

* * * * *